United States Patent
Dhanapal et al.

(10) Patent No.: US 11,291,080 B2
(45) Date of Patent: Mar. 29, 2022

(54) LINK QUALITY REPORTING ENHANCEMENTS FOR NEW RADIO

(71) Applicant: Apple Inc., Cupertino, CA (US)

(72) Inventors: Muthukumaran Dhanapal, Dublin, CA (US); Lakshmi Kavuri, Cupertino, CA (US); Alosious Pradeep Prabhakar, Singapore (SG); Vijay Venkataraman, San Jose, CA (US); Sulabh Khandelwal, San Jose, CA (US); Wen Zhao, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/863,473

(22) Filed: Apr. 30, 2020

(65) Prior Publication Data

US 2021/0345454 A1    Nov. 4, 2021

(51) Int. Cl.
| | |
|---|---|
| *H04W 4/00* | (2018.01) |
| *H04W 88/06* | (2009.01) |
| *H04W 76/15* | (2018.01) |
| *H04W 76/27* | (2018.01) |
| *H04W 80/08* | (2009.01) |
| *H04W 28/02* | (2009.01) |

(52) U.S. Cl.
CPC ....... *H04W 88/06* (2013.01); *H04W 28/0268* (2013.01); *H04W 76/15* (2018.02); *H04W 76/27* (2018.02); *H04W 80/08* (2013.01)

(58) Field of Classification Search
CPC ..... H04W 88/06; H04W 88/10; H04W 76/15; H04W 76/27; H04W 80/02; H04W 80/04; H04W 80/08; H04W 80/085; H04W 28/0268; H04W 28/06; H04W 28/0942; H04W 28/0933; H04W 36/0055; H04W 36/0069; H04W 40/125; H04W 40/14; H04W 40/16; H04W 40/18; H04W 40/20; H04W 40/24
USPC ..................................................... 370/329
See application file for complete search history.

(56) References Cited

U.S. PATENT DOCUMENTS

2021/0076441 A1* 3/2021 Guha ................ H04W 76/16

* cited by examiner

*Primary Examiner* — Huy C Ho
(74) *Attorney, Agent, or Firm* — Eschweiler & Potashnik, LLC

(57) ABSTRACT

A user equipment (UE), or other network component can operate to configure a plurality of new radio (NR) links of a E-UTRAN new radio (NR) dual connectivity (EN-DC) comprising a first radio access technologies (RAT) and a second, different RAT. A first link quality metric (LQM) evaluation of the first RAT is generated independently of generating a second LQM evaluation of the second RAT. A radio frequency (RF) interface, is configured to provide, to RF circuitry, data for a transmission of the first LQM evaluation and the second LQM evaluation based on a data split at a protocol layer so that a network component of base station can utilize the data to configure a data flow over the links based on link quality metrics provided.

21 Claims, 12 Drawing Sheets

| LQM State | Entry from State | Entry Criteria | Exit to State | Exit Criteria | Other Criteria |
|---|---|---|---|---|---|
| Abort (RRC_IDLE) | • Good<br>• Fair<br>• Minimally Viable | • n2 consecutive RRCSetupRequest timeouts within T300<br>• n3 reselection failures in Normal mobility state within 30s<br>• n3 reselection failures in Medium mobility state (NCR_M) within 20s<br>• n3 reselection failures in High mobility state (NCR_H) within 15s<br>• n5 Consecutive On-demand-SIB request failures (RRCSystemInfo Request or RACH failure)<br>• n1 Consecutive RRC Rejects for RRCSetupRequest<br>• None of the beams satisfy absThreshSS-BlocksConsolidation for the higher rank frequency<br>    eg., UE camped to FR2. FR1 frequency has same priority level, but none of the beams satisfy absThreshSS-BlocksConsolidation | • Good<br>• Fair<br>• Minimally Viable | • Successful RRCSetup procedure<br>• Received On-demand-SIB successfully. AND<br>• UE camped on cell without re-selection failures for last X minutes | When device camped on FR2, always disallow background traffic<br><br>Exit from Abort to a better state may happen no sooner than T seconds after entry.<br><br>Cool off timer - Once we exit from LQM Abort, wait at least 30 secs before criteria matches to re-enter |

*FIG. 8*

| LQM State | Entry from State | Entry Criteria | Exit to State | Exit Criteria | Other Criteria |
|---|---|---|---|---|---|
| Abort (RRC INACTIVE) | • Good<br>• Fair<br>• Minimally Viable | • n1 Consecutive RRC Rejects for RRCResumeRequest<br>• n2 consecutive RRCSetupRequest timeouts within T319<br>• n8 Consecutive RNA update failures<br>• Same conditions as RRC-IDLE apply for RRC-INACTIVE in addition to above criteria | • Good<br>• Fair<br>• Minimally Viable | • Successful RRCResume procedure<br>• Received On-demand-SIB successfully<br>• Successful RNA update procedure | Exit from Abort to a better state may happen no sooner than 60 seconds after entry.<br><br>Cool off timer - Once we exit from LQM Abort, wait at least 30 secs before criteria matches to re- enter |

*FIG. 9*

| LQM State | Entry from State | Entry Criteria | Exit to State | Exit Criteria | Other Criteria |
|---|---|---|---|---|---|
| Abort (RRC Connected) | • Good<br>• Fair<br>• Minimally Viable | • Max Tx power utilised for more than a min with very high BSR pending on UE & SUL not available. If LTE neighbour has better RF but doesn't satisfy B2 threshold. Drop to LTE and continue UL transmission<br>• UL Grant on FR2 not continuous<br>• x1 Beam failures within y1 mins in FR1<br>• x2 beam failures within y2 mins in FR2<br>• UEAssistanceInformation message with overheatingAssistance sent by device<br>• x3 RLFs when on FR2 within y3 seconds<br>• Ping pong handover between same two NR cells multiple times, but UL/DL limited<br>• x4 consecutive Reconfiguration failure within y4 seconds (same cells involved 15 seconds timer)<br>• x6 consecutive SCG failures with the same NR cell within x mins<br>• x7 consecutive SCG failures with different NR cells within x min | • Good<br>• Fair<br>• Minimally Viable | • Successful RRCReconfiguration procedure<br>• No overheating of UE<br>• Acceptable UL/DL traffic | Exit from Abort to a better state may happen no sooner than 60 seconds after entry.<br><br>Cool off timer - Once we exit from LQM Abort, wait at least 30 secs before criteria matches to re-enter |

*FIG. 10*

LINK QUALITY REPORTING ENHANCEMENTS FOR NEW RADIO

FIELD

The present disclosure relates to wireless technology, including to link quality reporting enhancements in new radio (NR) based communications.

BACKGROUND

Mobile communication in the next generation wireless communication system, 5G, or new radio (NR) network will provide ubiquitous connectivity and access to information, as well as ability to share data, around the globe. 5G networks and network slicing will be a unified, service-based framework that will target to meet versatile and sometimes, conflicting performance criteria and provide services to vastly heterogeneous application domains ranging from Enhanced Mobile Broadband (eMBB) to massive Machine-Type Communications (mMTC), Ultra-Reliable Low-Latency Communications (URLLC), and other communications. In general, NR will evolve based on third generation partnership project (3GPP) long term evolution (LTE)-Advanced technology with additional enhanced radio access technologies (RATs) to enable seamless and faster wireless connectivity solutions.

5G systems are further configured with an LTE-NR tight-interworking known as evolved universal mobile telecommunications system terrestrial radio access network new radio (E-UTRAN-NR) Dual Connectivity (EN-DC). With this network architecture, the existing LTE radio and core network are used as a master entity for mobility management and coverage while adding an additional secondary carrier (e.g., an additional 5G carrier). EN-DC is expected to be able to deliver better coverage and capacity compared to standalone LTE and NR technologies deployed alone across control and user plane domains. Dual connectivity at different base stations aims at increasing the per-user throughput by improving the utilization of radio resources across two base stations connected via non-ideal backhaul (X2) and operating on different carrier frequencies. By making it possible to maintain the connection to the primary cell located in the macro base station while accessing the extra capacity provided by the small cell layer, dual connectivity can also improve the mobility performance in small cell deployments. Dual connectivity allows users to be simultaneously served by a macro and a small cell operating at different carriers, while the corresponding base stations (e.g., serving evolved NodeBs (eNBs), next generation NodeBs (gNBs), access point(s), or other network component) can be interconnected with traditional X2-based backhaul connections. These types of backhaul connections can be cheaper but characterized by lower capacity and higher latency compared to the high-speed fiber-based fronthaul connections assumed with inter-site carrier aggregation CA.

BRIEF DESCRIPTION OF THE DRAWINGS

FIGS. 8-10 illustrated different RRC states and corresponding conditions to enter an LQM abort with various aspects herein

DETAILED DESCRIPTION

Figure 1:
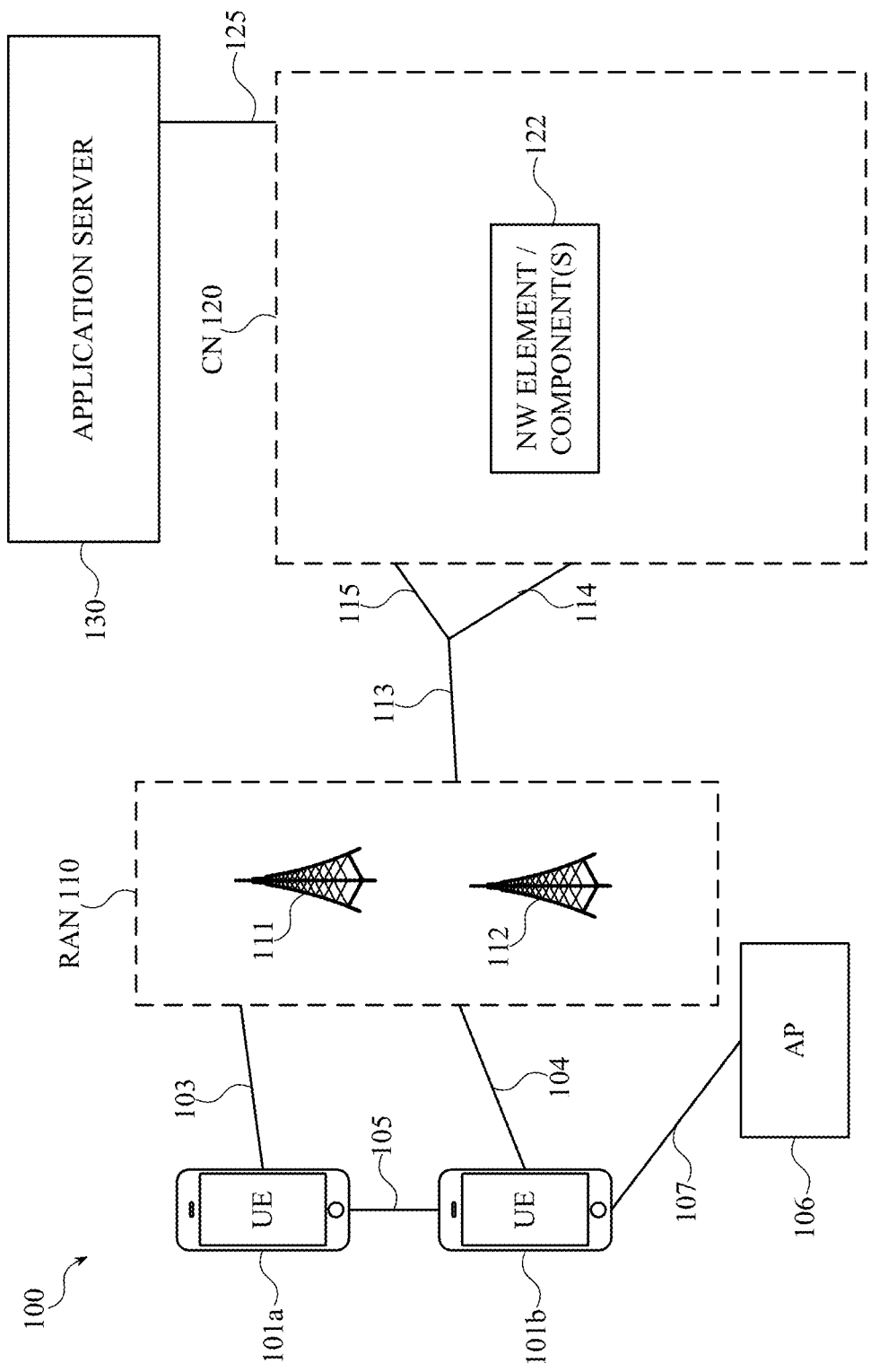
FIG. 1 is an exemplary block diagram illustrating an example of user equipment(s) (UEs) communicatively coupled a network with network components as peer devices useable in connection with various aspects described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct or they can be the same, although in some situations the context can indicate that they are distinct or that they are the same.

As used herein, the term "circuitry" can refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

In consideration of various concerns for increasing the per-user throughput by improving the utilization of radio resources across two base stations connected via non-ideal backhaul (X2) and operating on different carrier frequencies various mechanisms can be implemented for configuring LTE-NR tight-interworking known as E-UTRAN-NR Dual Connectivity (EN-DC). These mechanisms can include components and operations for configuring the evaluation and reporting of link quality metrics (LQMs) involved in LQM evaluations of EN-DC links. According to the LQM evaluations of the different links associated with different radio access technologies (RATs) at a single user device or user equipment (UE), the eNB or gNB can manage data flow via the different links connecting the UE to the network. These LQM evaluations can be performed independently/separately for each RAT with links to the UE, performed on a per component carrier basis, and dependent on an uplink (UL) or downlink (DL) data flow direction. Additionally, or alternatively, the LQMs can be evaluated by computing them based on different weights or weightings. These weights can be associated to different links or different RATs associated with the links connecting the UE to the network cells (e.g., a primary cell (Pcell), primary second cell (PScell), or a secondary second cell (SScell) of a secondary cell group). Further, when the network device or UE is performing an active foreground data transfer (either as a high priority or Low priority transfer), then LQM evaluation reporting or related LQM factors could be suppressed such that a lower LQM gets reported to AP in order to facilitate that a Low priority Background transfer of data gets backed off. Additional aspects and details of the disclosure are further described below with reference to figures.

FIG. 1 illustrates an example architecture of a system 100 of a network, in accordance with various aspects. The following description is provided for an example system 100 that operates in conjunction with the LTE system standards and 5G or NR system standards as provided by 2GPP technical specifications. However, the example aspects are not limited in this regard and the described aspects can apply to other networks that benefit from the principles described herein, such as future 2GPP systems (e.g., Sixth Generation (6G)) systems, IEEE 802.16 protocols (e.g., WMAN, WiMAX, etc.), or the like.

As shown by FIG. 1, the system 100 includes UE 101*a* and UE 101*b* (collectively referred to as "UEs 101" or "UE 101"). In this example, UEs 101 are illustrated as smartphones (e.g., handheld touchscreen mobile computing devices connectable to one or more cellular networks), but can comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, Machine Type Communication (MTC) devices, Machine to Machine (M2M), Internet of Things (IoT) devices, and/or the like.

In some aspects, any of the UEs 101 can be IoT UEs, which can comprise a network access layer designed for low-power IoT applications utilizing short-lived UE connections. An IoT UE can utilize technologies such as M2M or MTC for exchanging data with an MTC server or device via a public land mobile network (PLMN), Proximity Services (ProSe) or Device-to-Device (D2D) communication, sensor networks, or IoT networks. The M2M or MTC exchange of data can be a machine-initiated exchange of data. An IoT network describes interconnecting IoT UEs, which can include uniquely identifiable embedded computing devices (within the Internet infrastructure), with short-lived connections. The IoT UEs can execute background applications (e.g., keep-alive messages, status updates, etc.) to facilitate the connections of the IoT network.

The UEs 101 can be configured to connect, for example, communicatively couple, with a Radio Access Network (RAN) 110. In aspects, the RAN 110 can be an next generation (NG) RAN or a 5G RAN, an evolved-UMTS Terrestrial RAN (E-UTRAN), or a legacy RAN, such as a UTRAN or GERAN. As used herein, the term "NG RAN" or the like can refer to a RAN 110 that operates in an NR or 5G system 100, and the term "E-UTRAN" or the like can refer to a RAN 110 that operates in an LTE or 4G system 100. The UEs 101 utilize connections (or channels) 102 and 104, respectively, each of which comprises a physical communications interface/layer.

Alternatively, or additionally, each of the UEs 101 can be configured with dual connectivity (DC) as a multi-RAT or multi-Radio Dual Connectivity (MR-DC), where a multiple Rx/Tx capable UE may be configured to utilize resources provided by two different nodes (e.g., 111, 112, or other network nodes) that can be connected via non-ideal backhaul, one providing NR access and the other one providing either E-UTRA for LTE or NR access for 5G, for example. One node can act as a master node (MN) and the other as the secondary node (SN). The MN and SN can be connected via a network interface and at least the MN is connected to the core network 120. At least one of the MN or the SN can be operated with shared spectrum channel access. All functions specified for a UE can be used for an integrated access and backhaul mobile termination (IAB-MT). Similar for UE 101, the IAB-MT can access the network using either one network node or using two different nodes with EN-DC architectures, NR-DC architectures, or the like.

In MR-DC, a group of serving cells associated with a master Node can be configured as a master cell group (MCG), comprising of a special cell (SpCell) as a primary cell (PCell) and optionally one or more secondary cells (SCells). A MCG can be the radio access node that provides the control plane connection to the core network 120; it may be a Master eNB (in EN-DC), a Master ng-eNB (in NGEN-DC) or a Master gNB (in NR-DC and NE-DC), for example. SpCell can either refer to the PCell of the MCG or the PSCell of a second cell group (SCG) depending on if the MAC entity that is associated to the MCG or the SCG, respectively. An SpCell can refer to a PCell of MCG or an SCG. A SCG in MR-DC can be a group of serving cells associated with an SN, comprising of the SpCell as a primary secondary cell (PSCell) and optionally one or more SCells.

In this example, the connections 102 and 104 are illustrated as an air interface to enable communicative coupling, and can be consistent with cellular communications protocols, such as a Global System for Mobile communications (GSM) protocol, a Code-Division Multiple Access (CDMA) network protocol, a Push-to-Talk (PTT) protocol, a PTT over-cellular (POC) protocol, a Universal Mobile Telecommunications Service (UMTS) protocol, a 2GPP LTE protocol, a 5G protocol, a NR protocol, and/or any of the other communications protocols discussed herein. In aspects, the UEs 101 can directly exchange communication data via a ProSe interface 105. The ProSe interface 105 can alternatively be referred to as a SL interface 105 and can comprise one or more logical channels, including but not limited to a physical sidelink control channel (PSCCH), a physical sidelink shared channel (PSSCH), a physical sidelink discovery channel (PSDCH), and a physical sidelink broadcast channel (PSBCH).

The UE 101b is shown to be configured to access an AP 106 (also referred to as "WLAN node 106," "WLAN 106," "WLAN Termination 106," "WT 106" or the like) via connection 107. The connection 107 can comprise a local wireless connection, such as a connection consistent with any IEEE 802.11 protocol, wherein the AP 106 would comprise a wireless fidelity (Wi-Fi®) router. In this example, the AP 106 is shown to be connected to the Internet without connecting to the core network of the wireless system (described in further detail below). In various aspects, the UE 101b, RAN 110, and AP 106 can be configured to utilize LTE-WLAN aggregation (LWA) operation and/or LTE-WLAN Radio Level Integration with IPsec Tunnel (LWIP) operation. The LWA operation can involve the UE 101b in radio resource control RRC_CONNECTED being configured by a RAN node 111a-b to utilize radio resources of LTE and WLAN. LWIP operation can involve the UE 101b using WLAN radio resources (e.g., connection 107) via IPsec protocol tunneling to authenticate and encrypt packets (e.g., IP packets) sent over the connection 107. IPsec tunneling can include encapsulating the entirety of original IP packets and adding a new packet header, thereby protecting the original header of the IP packets.

The RAN 110 can include one or more access AN nodes or RAN nodes 111a and 111b (collectively referred to as "RAN nodes 111" or "RAN node 111") that enable the connections 102 and 104. As used herein, the terms "access node," "access point," or the like can describe equipment that provides the radio baseband functions for data and/or voice connectivity between a network and one or more users. These access nodes can be referred to as BS, gNBs, RAN nodes, eNBs, NodeBs, RSUs, Transmission Reception Points (TRxPs) or TRPs, and so forth, and can comprise ground stations (e.g., terrestrial access points) or satellite stations providing coverage within a geographic area (e.g., a cell). As used herein, the term "NG RAN node" or the like can refer to a RAN node 111 that operates in an NR or 5G system 100 (for example, a gNB), and the term "E-UTRAN node" or the like can refer to a RAN node 111 that operates in an LTE or 4G system 100 (e.g., an eNB). According to various aspects, the RAN nodes 111 can be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

Any of the RAN nodes 111 can terminate the air interface protocol and can be the first point of contact for the UEs 101. In some aspects, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In aspects, the UEs 101 can be configured to communicate using Orthogonal Frequency-Division Multiplexing (OFDM) communication signals with each other or with any of the RAN nodes 111 over a multicarrier communication channel in accordance with various communication techniques, such as, but not limited to, an OFDMA communication technique (e.g., for downlink communications) or a Single Carrier Frequency-Division Multiple Access (SC-FDMA) communication technique (e.g., for uplink and ProSe or sidelink communications), although the scope of the aspects is not limited in this respect. The OFDM signals can comprise a plurality of orthogonal subcarriers.

In some aspects, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this can represent the smallest quantity of resources that currently can be allocated. There are several different physical downlink channels that are conveyed using such resource blocks.

According to various aspects, the UEs 101 and the RAN nodes 111 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum can include channels that operate in the frequency range of approximately 400 MHz to approximately 2.8 GHz, whereas the unlicensed spectrum can include the 5 GHz band.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 101, AP 106, or the like) intends to transmit, the WLAN node can first perform CCA before transmission. Additionally, a backoff mechanism is used to avoid collisions in situations where more than one WLAN node senses the channel as idle and transmits at the same time. The backoff mechanism can be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for downlink (DL) or uplink (UL) transmission bursts including physical downlink shared channel (PDSCH) or physical uplink shared channel (PUSCH) transmissions, respectively, can have an LAA contention window that is variable in length between X and Y extended CCA (ECCA) slots, where X and Y are minimum and maximum values for the contention window sizes (CWSs) for LAA. In one example, the minimum CWS for an LAA transmission can be 9 microseconds (µs); however, the size of the CWS and a maximum channel occupancy time (MOOT) (for example, a transmission burst) can be based on governmental regulatory requirements.

The LAA mechanisms are built upon carrier aggregation (CA) technologies of LTE-Advanced systems. In CA, each aggregated carrier is referred to as a component carrier (CC). A CC can have a bandwidth of 1.4, 2, 5, 10, 15 or 20 MHz and a maximum of about five CCs or otherwise can be aggregated, and therefore, a maximum aggregated bandwidth can be about 100 MHz, for example. In frequency division duplex (FDD) systems, the number of aggregated carriers can be different for DL and UL, where the number of UL CCs is equal to or lower than the number of DL component carriers. In some cases, individual CCs can have a different bandwidth than other CCs. In time division duplex (TDD) systems, the number of CCs as well as the bandwidths of each CC is usually the same for DL and UL.

CA also comprises individual serving cells to provide individual CCs. The coverage of the serving cells can differ, for example, because CCs on different frequency bands will experience different pathloss. A primary service cell or PCell can provide a primary component carrier (PCC) for both UL and DL, and can handle radio resource control (RRC) and non-access stratum (NAS) related activities. The other serving cells are referred to as SCells, and each SCell can provide an individual secondary component carrier (SCC) for both UL and DL. The SCCs can be added and removed as required, while changing the PCC can require the UE 101 to undergo a handover. In LAA, eLAA, and feLAA, some or all of the SCells can operate in the unlicensed spectrum (referred to as "LAA SCells"), and the LAA SCells are assisted by a PCell operating in the licensed spectrum. When a UE is configured with more than one LAA SCell, the UE can receive UL grants on the configured LAA SCells indicating different PUSCH starting positions within a same subframe.

The PDSCH carries user data and higher-layer signaling to the UEs 101. The physical downlink control channel (PDCCH) carries information about the transport format and resource allocations related to the PDSCH channel, among other things. It can also inform the UEs 101 about the transport format, resource allocation, and Hybrid Automatic Repeat Request (HARQ) information related to the uplink shared channel. Typically, downlink scheduling (assigning control and shared channel resource blocks to the UE 101*b* within a cell) can be performed at any of the RAN nodes 111 based on channel quality information fed back from any of the UEs 101. The downlink resource assignment information can be sent on the PDCCH used for (e.g., assigned to) each of the UEs 101.

The PDCCH uses control channel elements (CCEs) to convey the control information. Before being mapped to resource elements, the PDCCH complex-valued symbols can first be organized into quadruplets, which can then be permuted using a sub-block interleaver for rate matching. Each PDCCH can be transmitted using one or more of these CCEs, where each CCE can correspond to nine sets of four physical resource elements known as REGs. Four Quadrature Phase Shift Keying (QPSK) symbols can be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some aspects can use concepts for resource allocation for control channel information that are an extension of the above-described concepts. For example, some aspects can utilize an extended (E)-PDCCH that uses PDSCH resources for control information transmission. The EPDCCH can be transmitted using one or more ECCEs. Similar to above, each ECCE can correspond to nine sets of four physical resource elements known as an EREGs. An ECCE can have other numbers of EREGs in some situations.

The RAN nodes 111 can be configured to communicate with one another via interface 112. In aspects where the system 100 is an LTE system, the interface 112 can be an X2 interface 112. The X2 interface can be defined between two or more RAN nodes 111 (e.g., two or more eNBs and the like) that connect to evolved packet core (EPC) or core network 120, and/or between two eNBs connecting to EPC 120. In some implementations, the X2 interface can include an X2 user plane interface (X2-U) and an X2 control plane interface (X2-C). The X2-U can provide flow control mechanisms for user data packets transferred over the X2 interface, and can be used to communicate information about the delivery of user data between eNBs. For example, the X2-U can provide specific sequence number information for user data transferred from a master eNB (MeNB) to an secondary eNB (SeNB); information about successful in sequence delivery of PDCP packet data units (PDUs) to a UE 101 from an SeNB for user data; information of PDCP PDUs that were not delivered to a UE 101; information about a current minimum desired buffer size at the SeNB for transmitting to the UE user data; and the like. The X2-C can provide intra-LTE access mobility functionality, including context transfers from source to target eNBs, user plane transport control, etc.; load management functionality; as well as inter-cell interference coordination functionality.

In aspects where the system 100 is a 5G or NR system, the interface 112 can be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two eNBs connecting to 5GC 120. In some implementations, the Xn interface can include an Xn user plane (Xn-U) interface and an Xn control plane (Xn-C) interface. The Xn-U can provide non-guaranteed delivery of user plane PDUs and support/provide data forwarding and flow control functionality. The Xn-C can provide management and error handling functionality, functionality to manage the Xn-C interface; mobility support for UE 101 in a connected mode (e.g., CM-CONNECTED) including functionality to manage the UE mobility for connected mode between one or more RAN nodes 111. The mobility support can include context transfer from an old (source) serving RAN node 111 to new (target) serving RAN node 111; and control of user plane tunnels between old (source) serving RAN node 111 to new (target) serving RAN node 111. A protocol stack of the Xn-U can include a transport network layer built on Internet Protocol (IP) transport layer, and a GPRS Tunnelling Protocol for User Plane (GTP-U) layer on top of a User Datagram Protocol (UDP) and/or IP layer(s) to carry user plane PDUs. The Xn-C protocol stack can include an application layer signaling protocol (referred to as Xn Application Protocol (Xn-AP)) and a transport network layer that is built on Stream Control Transmission Protocol (SCTP). The SCTP can be on top of an IP layer, and can provide the guaranteed delivery of application layer messages. In the transport IP layer, point-to-point transmission is used to deliver the signaling PDUs. In other implementations, the Xn-U protocol stack and/or the Xn-C protocol stack can be same or similar to the user plane and/or control plane protocol stack(s) shown and described herein.

The RAN 110 is shown to be communicatively coupled to a core network—in this aspect, core network (CN) 120. The CN 120 can comprise a plurality of network elements 122, which are configured to offer various data and telecommunications services to customers/subscribers (e.g., users of UEs 101) who are connected to the CN 120 via the RAN 110. The components of the CN 120 can be implemented in one physical node or separate physical nodes including components to read and execute instructions from a machine-readable or computer-readable medium (e.g., a non-transitory machine-readable storage medium). In some aspects, NFV can be utilized to virtualize any or all of the above-described network node functions via executable instructions stored in one or more computer-readable storage mediums (described in further detail below). A logical instantiation of the CN 120 can be referred to as a network slice, and a logical instantiation of a portion of the CN 120 can be referred to as a network sub-slice. Network Function Virtualization (NFV) architectures and infrastructures can be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more Evolved Packet Core (EPC) components/functions.

Generally, the application server 130 can be an element offering applications that use IP bearer resources with the core network (e.g., Universal Mobile Telecommunications System Packet Services (UMTS PS) domain, LTE PS data services, etc.). The application server 130 can also be configured to support one or more communication services (e.g., VoIP sessions, PTT sessions, group communication sessions, social networking services, etc.) for the UEs 101 via the EPC 120.

In aspects, the CN 120 can be a 5GC (referred to as "5GC 120" or the like), and the RAN 110 can be connected with the CN 120 via an NG interface 112. In aspects, the NG interface 112 can be split into two parts, an Next Generation (NG) user plane (NG-U) interface 114, which carries traffic data between the RAN nodes 111 and a User Plane Function (UPF), and the S1 control plane (NG-C) interface 115, which is a signaling interface between the RAN nodes 111 and Access and Mobility Management Functions (AMFs). The Core network CN 120 can also be a 5GC 120.

In aspects, the CN 120 can be a 5G CN (referred to as "5GC 120" or the like), while in other aspects, the CN 120 can be an evolved packet core (EPC)). Where CN 120 is an EPC (referred to as "EPC 120" or the like), the RAN 110 can be connected with the CN 120 via an S1 interface 112. In aspects, the S1 interface 112 can be split into two parts, an S1 user plane (S1-U) interface 114, which carries traffic data between the RAN nodes 111 and the S-GW, and the S1-MME interface 115, which is a signaling interface between the RAN nodes 111 and MMEs.

Figure 2:
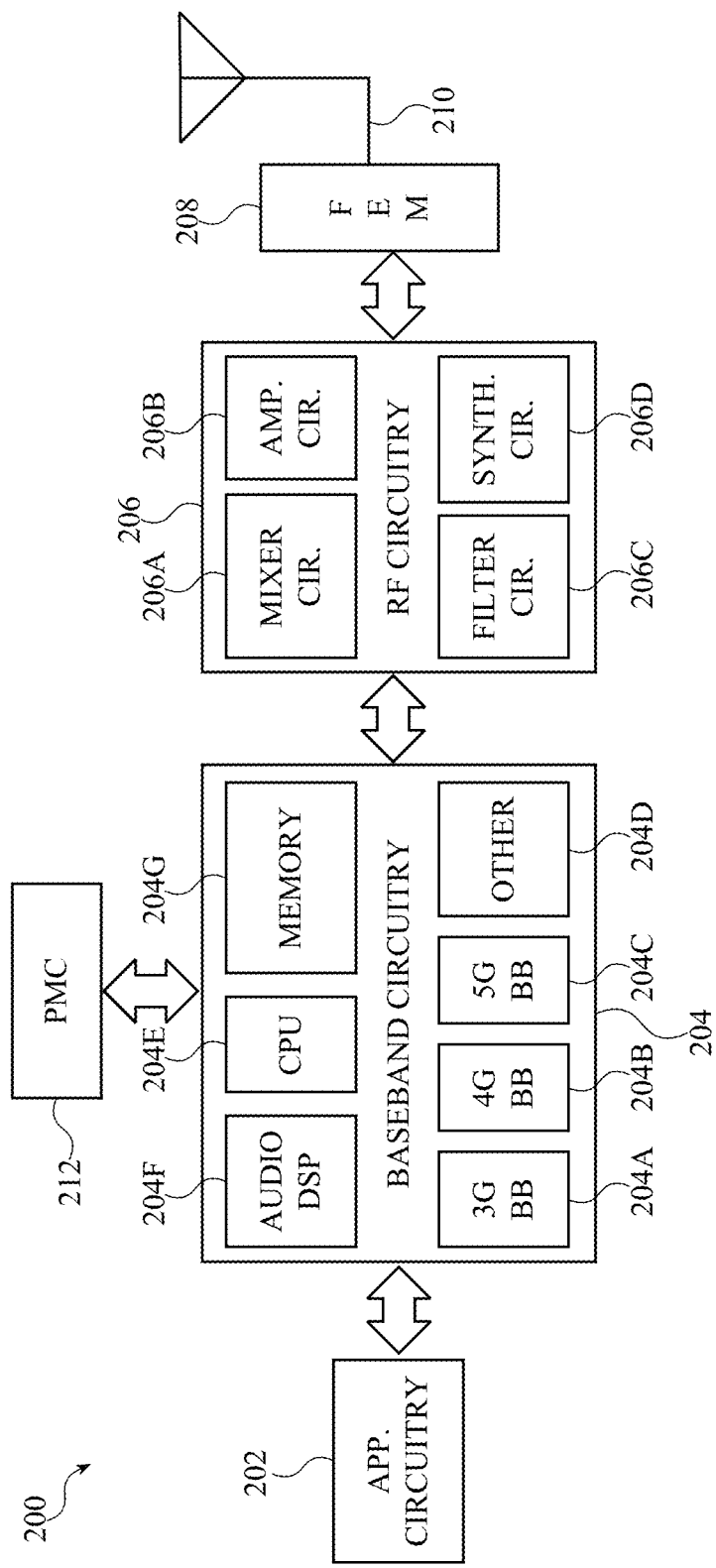
FIG. 2 is an example architecture of a system of a network, in accordance with various aspects.

FIG. 2 illustrates example components of a device 200 in accordance with some aspects. In some aspects, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a UE or a RAN node, such as UE 101/102, or eNB/gNB 111/112. In some aspects, the device 200 can include less elements (e.g., a RAN node can not utilize application circuitry 202, and instead include a processor/controller to process IP data received from an EPC). In some aspects, the device 200 can include additional elements such as, for example, memory/storage, display, camera, sensor, or input/output (I/O) interface. In other aspects, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some aspects, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband processing circuity 204 can interface with the application circuitry 202 for generation and processing of the baseband signals and for controlling operations of the RF circuitry 206. For example, in some aspects, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) can handle various radio control functions that enable communication with one or more radio networks via the RF circuitry 206. In other aspects, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some aspects, modulation/demodulation circuitry of the baseband circuitry 204 can include Fast-Fourier Transform (FFT), precoding, or constellation mapping/demapping functionality. In some aspects, encoding/decoding circuitry of the baseband circuitry 204 can include convolution, tail-biting convolution, turbo, Viterbi, or Low Density Parity Check (LDPC) encoder/decoder functionality. Aspects of modulation/demodulation and encoder/decoder functionality are not limited to these examples and can include other suitable functionality in other aspects.

In addition, the memory 204G (as well as other memory components discussed herein, e.g., memory, data storage, or the like) can comprise one or more machine-readable medium/media including instructions that, when performed by a machine or component herein cause the machine to perform acts of the method or of an apparatus or system for concurrent communication using multiple communication technologies according to aspects and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection can also be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium.

In some aspects, the baseband circuitry 204 can include one or more audio digital signal processor(s) (DSP) 204F. The audio DSP(s) 204F can be include elements for compression/decompression and echo cancellation and can include other suitable processing elements in other aspects. Components of the baseband circuitry can be suitably combined in a single chip, a single chipset, or disposed on a same circuit board in some aspects. In some aspects, some or all of the constituent components of the baseband circuitry 204 and the application circuitry 202 can be implemented together such as, for example, on a system on a chip (SOC).

In some aspects, the baseband circuitry 204 can provide for communication compatible with one or more radio technologies. For example, in some aspects, the baseband circuitry 204 can support communication with an evolved universal terrestrial radio access network (EUTRAN) or other wireless metropolitan area networks (WMAN), a wireless local area network (WLAN), a wireless personal area network (WPAN). Aspects in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various aspects, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some aspects, the receive signal path of the RF circuitry 206 can include mixer circuitry 206a, amplifier circuitry 206b and filter circuitry 206c. In some aspects, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some aspects, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some aspects, the output baseband signals can be zero-frequency baseband signals, although this is not a requirement. In some aspects, mixer circuitry 206a of the receive signal path can comprise passive mixers, although the scope of the aspects is not limited in this respect.

In some aspects, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some aspects, the mixer circuitry 206a of the receive signal path and the mixer circuitry 206a of the transmit signal path can include two or more mixers and can be arranged for quadrature downconversion and upconversion, respectively. In some aspects, the mixer circuitry 206a of the receive signal path and the mixer circuitry 206a of the transmit signal path can include two or more mixers and can be arranged for image rejection (e.g., Hartley image rejection). In some aspects, the mixer circuitry 206a of the receive signal path and the mixer circuitry 206a can be arranged for direct downconversion and direct upconversion, respectively. In some aspects, the mixer circuitry 206a of the receive signal path and the mixer circuitry 206a of the transmit signal path can be configured for super-heterodyne operation.

In some aspects, the output baseband signals and the input baseband signals can be analog baseband signals, although the scope of the aspects is not limited in this respect. In some alternate aspects, the output baseband signals and the input baseband signals can be digital baseband signals. In these alternate aspects, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode aspects, a separate radio IC circuitry can be provided for processing signals for each spectrum, although the scope of the aspects is not limited in this respect.

In some aspects, the synthesizer circuitry 206d can be a fractional-N synthesizer or a fractional N/N+1 synthesizer, although the scope of the aspects is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some aspects, the synthesizer circuitry 206d can be a fractional N/N+1 synthesizer.

In some aspects, frequency input can be provided by a voltage-controlled oscillator (VCO), although that is not a requirement. Divider control input can be provided by either the baseband circuitry 204 or the applications processor 202 depending on the desired output frequency. In some aspects, a divider control input (e.g., N) can be determined from a look-up table based on a channel indicated by the applications processor 202.

Synthesizer circuitry 206d of the RF circuitry 206 can include a divider, a delay-locked loop (DLL), a multiplexer and a phase accumulator. In some aspects, the divider can be a dual modulus divider (DMD) and the phase accumulator can be a digital phase accumulator (DPA). In some aspects, the DMD can be configured to divide the input signal by either N or N+1 (e.g., based on a carry out) to provide a fractional division ratio. In some example aspects, the DLL can include a set of cascaded, tunable, delay elements, a phase detector, a charge pump and a D-type flip-flop. In these aspects, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some aspects, synthesizer circuitry 206d can be configured to generate a carrier frequency as the output frequency, while in other aspects, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some aspects, the output frequency can be a LO frequency (fLO). In some aspects, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various aspects, the amplification through the transmit or receive signal paths can be done solely in the RF circuitry 206, solely in the FEM 208, or in both the RF circuitry 206 and the FEM 208.

In some aspects, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some aspects, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 illustrates the PMC 212 coupled only with the baseband circuitry 204. However, in other aspects, the PMC 212 can be additionally or alternatively coupled with, and perform similar power management operations for, other components such as, but not limited to, application circuitry 202, RF circuitry 206, or FEM 208.

In some aspects, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 can not receive data in this state, in order to receive data, it transitions back to RRC_Connected state.

For low latency/low power operations, the device 200 can be configured to suspend/resume in 5G NR by utilizing the RRC_Inactive state, which can significantly reduce latency and minimize the battery consumption. In the suspend procedure, both the UE and the RAN store information about the UE transition from connected to inactive, along with the UE radio protocol configuration. The resume procedure optimizes the transition from inactive to connected by restoring the UE radio protocol configuration. RAN-based location management and RAN paging make it possible for UEs in the inactive state to move around in an area without notifying the network.

Processors of the application circuitry 202 and processors of the baseband circuitry 204 can be used to execute elements of one or more instances of a protocol stack. For example, processors of the baseband circuitry 204, alone or in combination, can be used to execute Layer 3, Layer 2, or Layer 1 functionality, while processors of the application circuitry 204 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 3:
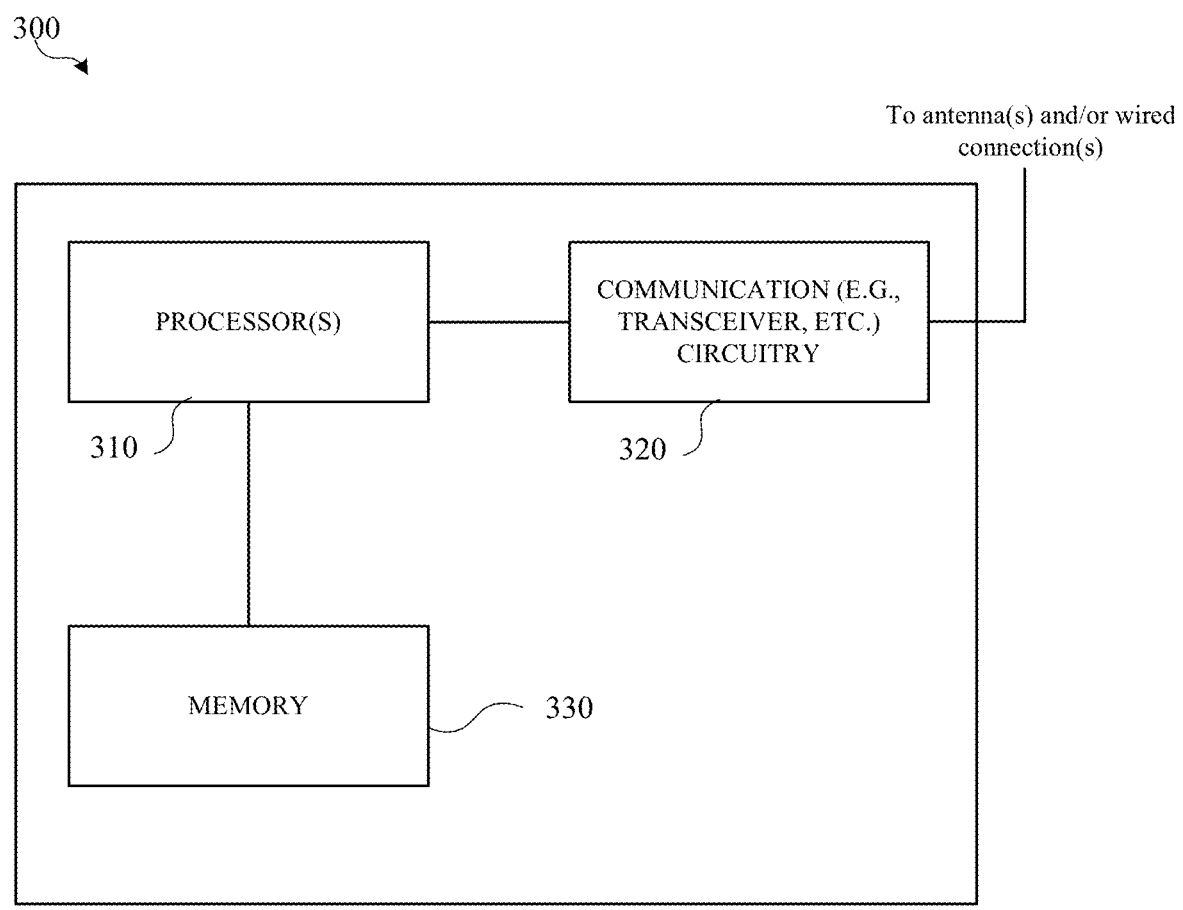
FIG. 3 is an exemplary a simplified block diagram of a user equipment (UE) wireless communication device or other network device/component (e.g., eNB, gNB) in accordance with various aspects described.

Referring to FIG. 3, illustrated is a block diagram of a user equipment wireless communication device (UE) or other network device/component (e.g., gNB, eNB, or other participating network entity/component). The UE device 300 includes one or more processors 310 (e.g., one or more baseband processors) comprising processing circuitry and associated interface(s), transceiver circuitry 320 (e.g., comprising RF circuitry, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 330 (which can comprise any of a variety of storage mediums and can store instructions and/or data associated with one or more of processor(s) 310 or transceiver circuitry 320).

According to various aspects, discontinuous reception (DRX) in NR is configured to optimize power consumption at the UE 101 while still allowing substantial flexibility in scheduling transmissions to the UE 101. In particular, the UE's active time can be "elastic" and be extended based on the amount of data that the gNB 110 schedules for the UE 101. If the gNB 110 has very little or no data to transmit to the UE 101, the UE 101 can revert to DRX sleep immediately after the on-duration. With this mechanism, the UE 101 can be configured with a fairly short on-duration while still allowing for delivery of a large amount of data within the DRX cycle. This ensures that the active time is short most of the time and longer only when there is a substantial amount of buffered data for the UE 101 at the gNB 110.

For operation of NR on an unlicensed carrier (referred to as NR-u in 3GPP) and associated with aspects/aspects/examples in this disclosure, transmissions can be performed after ensuring that the channel is not already being used by another device. This is done using a procedure called Listen-before-talk (LBT), where the device (e.g., gNB 110) wishing to transmit performs a channel measurement to check if the channel is busy. The device transmits only if LBT succeeds, i.e., the channel is found to be not busy, or is idle/available for use.

One consequence of the requirement to perform LBT is that transmissions can be delayed. If a gNB 110 has data for a UE 101 and a UE 101 is in its active time (awake and not asleep in idle mode itself), the gNB 110 can still not necessarily be able to transmit to the UE 101 because the channel is busy. This is natural given the shared nature of the unlicensed medium; however, it implies that in order to achieve the same latency for the data, the network (or gNB 110) has to configure DRX for the UE 101 such that the UE 101 wakes up more often (e.g., a shorter DRX cycle than prior to the (re) configuration of DRX) or stays awake longer (e.g., DRX duration is lengthened). In fact, it has been shown in past studies for LTE license assisted access (LAA), that even modest increases in activity on the carrier significantly increase the required active time (and correspondingly power consumption of the UE 101).

Thus, various aspects/aspects/examples herein are targeted at 3GPP standards to be adopted and implemented in NR products supporting NR-unlicensed (NR-u). Such aspects are presented as methods, operations, devices, or components below that minimize the impact to UE 101 power consumption from NR-u operation associated with DRX in NR based unlicensed communications.

Figure 4:
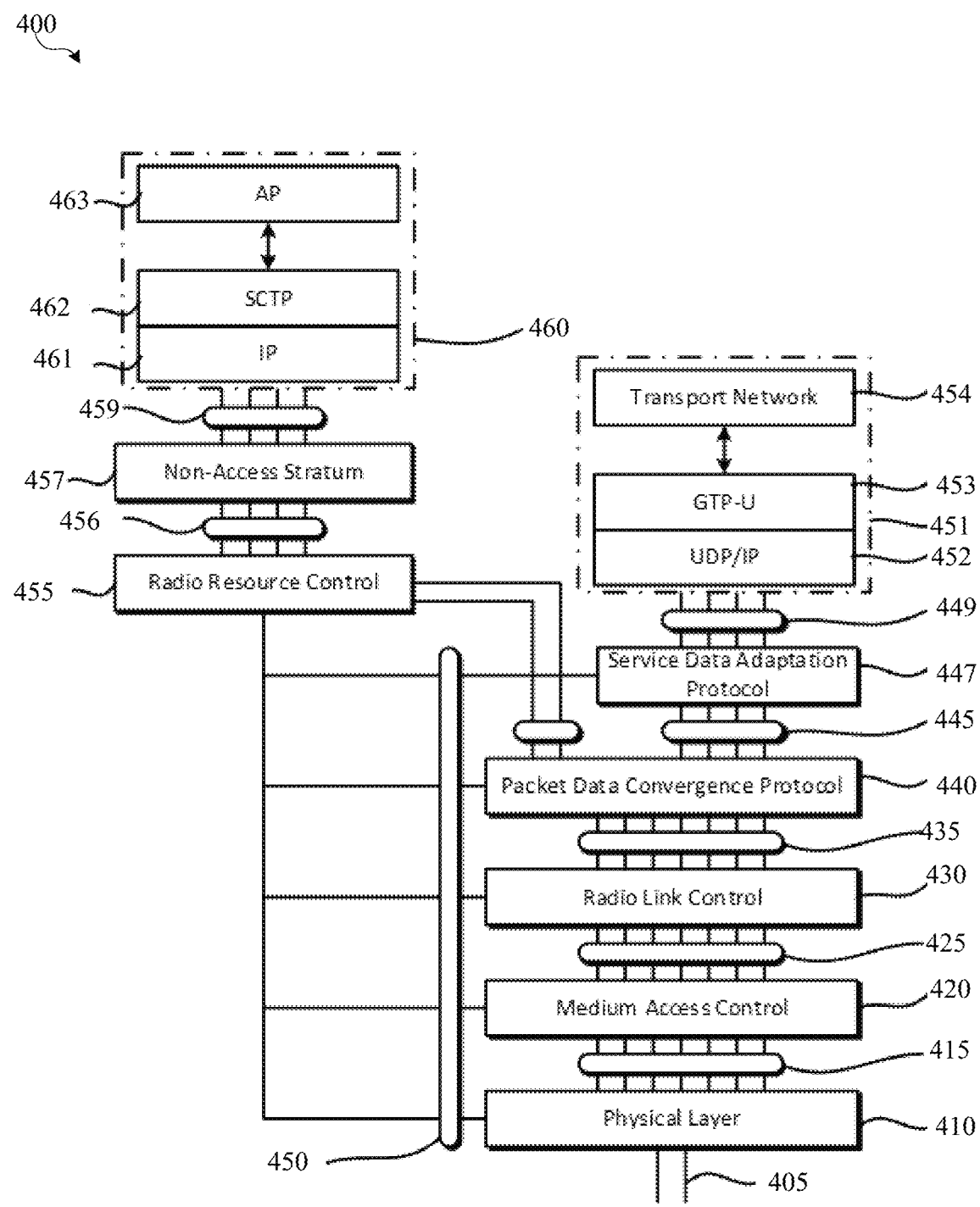
FIG. 4 is an illustration of various protocol functions that can be implemented in a wireless communication device with various aspects herein.

FIG. 4 illustrates various protocol functions that can be implemented in a wireless communication device according to various aspects herein. FIG. 4 includes an arrangement 400 showing interconnections between various protocol layers/entities. The following description of FIG. 4 is provided for various protocol layers/entities that operate in conjunction with the 5G/NR system standards and LTE system standards, but some or all of the aspects of FIG. 4 can be applicable to other wireless communication network systems as well.

The protocol layers of arrangement 400 can include one or more of Physical layer (PHY) 410, Media Access Control layer (MAC) 420, Radio Link Control layer (RLC) 430, Packet Data Convergence Protocol layer (PDCP) 440, Service Data Adaptation Protocol (SDAP) 447, Radio Resource Control layer (RRC) 455, and Non-Access Stratum (NAS) layer 457, in addition to other higher layer functions not illustrated. The protocol layers can include one or more service access points (e.g., items 459, 456, 450, 449, 445, 435, 425, and 415 in FIG. 4) that can provide communication between two or more protocol layers.

The PHY 410 can transmit and receive physical layer signals 405 that can be received from or transmitted to one or more other communication devices. The physical layer signals 405 can comprise one or more physical channels, such as those discussed herein. The PHY 410 can further perform link adaptation or adaptive modulation and coding (AMC), power control, cell search (e.g., for initial synchronization and handover purposes), and other measurements used by higher layers, such as the RRC 455. The PHY 410 can still further perform error detection on the transport channels, forward error correction (FEC) coding/decoding of the transport channels, modulation/demodulation of physical channels, interleaving, rate matching, mapping onto physical channels, and MIMO antenna processing. In aspects, an instance of PHY 410 can process requests from and provide indications to an instance of MAC 420 via one or more PHY-SAP 415. According to some aspects, requests and indications communicated via PHY-SAP 415 can comprise one or more transport channels.

Instance(s) of MAC 420 can process requests from, and provide indications to, an instance of RLC 430 via one or more MAC-SAPs 425. These requests and indications communicated via the MAC-SAP 425 can comprise one or more logical channels. The MAC 420 can perform mapping between the logical channels and transport channels, multiplexing of MAC SDUs from one or more logical channels onto TBs to be delivered to PHY 410 via the transport channels, de-multiplexing MAC SDUs to one or more logical channels from TBs delivered from the PHY 410 via transport channels, multiplexing MAC SDUs onto TBs, scheduling information reporting, error correction through HARQ, and logical channel prioritization.

Instance(s) of RLC 430 can process requests from and provide indications to an instance of PDCP 440 via one or more radio link control service access points (RLC-SAP) 435. These requests and indications communicated via RLC-SAP 435 can comprise one or more RLC channels. The RLC 430 can operate in a plurality of modes of operation, including: Transparent Mode (TM), Unacknowledged Mode (UM), and Acknowledged Mode (AM). The RLC 430 can execute transfer of upper layer protocol data units (PDUs), error correction through automatic repeat request (ARQ) for AM data transfers, and concatenation, segmentation and reassembly of RLC SDUs for UM and AM data transfers. The RLC 430 can also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 440 can process requests from and provide indications to instance(s) of RRC 455 and/or instance(s) of SDAP 447 via one or more packet data convergence protocol service access points (PDCP-SAP) 445. These requests and indications communicated via PDCP-SAP 445 can comprise one or more radio bearers. The PDCP 440 can execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 447 can process requests from and provide indications to one or more higher layer protocol entities via one or more SDAP-SAP 449. These requests and indications communicated via SDAP-SAP 449 can comprise one or more QoS flows. The SDAP 447 can map QoS flows to DRBs, and vice versa, and can also mark QFIs in DL and UL packets. A single SDAP entity 447 can be configured for an individual PDU session. In the UL direction, the NG-RAN 14 can control the mapping of QoS Flows to DRB(s) in two different ways, reflective mapping or explicit mapping. For reflective mapping, the SDAP 447 of a UE 101 can monitor the QFIs of the DL packets for each DRB and can apply the same mapping for packets flowing in the UL direction. For a DRB, the SDAP 447 of the UE 101 can map the UL packets belonging to the QoS flows(s) corresponding to the QoS flow ID(s) and PDU session observed in the DL packets for that DRB. To enable reflective mapping, the NG-RAN can mark DL packets over the Uu interface with a QoS flow ID. The explicit mapping can involve the RRC 455 configuring the SDAP 447 with an explicit QoS flow to DRB mapping rule, which can be stored and followed by the SDAP 447. In aspects, the SDAP 447 can only be used in NR implementations and can not be used in LTE implementations.

The RRC 455 can configure, via one or more management service access points (M-SAP), aspects of one or more protocol layers, which can include one or more instances of PHY 410, MAC 420, RLC 430, PDCP 440 and SDAP 447. In aspects, an instance of RRC 455 can process requests from and provide indications to one or more NAS entities 457 via one or more RRC-SAPs 456. The main services and functions of the RRC 455 can include broadcast of system information (e.g., included in MIBs or SIBs related to the NAS), broadcast of system information related to the access stratum (AS), paging, establishment, maintenance and release of an RRC connection between the UE 101 and RAN 14 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs can comprise one or more IEs, which can each comprise individual data fields or data structures.

The NAS 457 can form the highest stratum of the control plane between the UE 101 and the AMF. The NAS 457 can support the mobility of the UEs 101 and the session management procedures to establish and maintain IP connectivity between the UE 101 and a P-GW in LTE systems.

According to various aspects, one or more protocol entities of arrangement 400 can be implemented in UEs 101, RAN nodes 111, AMF in NR implementations or MME in LTE implementations, UPF in NR implementations or S-GW and P-GW in LTE implementations, or the like to be used for control plane or user plane communications protocol stack between the aforementioned devices. In such aspects, one or more protocol entities that can be implemented in one or more of UE 101, gNB 111, AMF, etc. can communicate with a respective peer protocol entity that can be implemented in or on another device using the services of respective lower layer protocol entities to perform such communication. In some aspects, a gNB-CU of the gNB 111 can host the RRC 455, SDAP 447, and PDCP 440 of the gNB that controls the operation of one or more gNB-DUs, and the gNB-DUs of the gNB 111 can each host the RLC 430, MAC 420, and PHY 44 of the gNB 111.

In a first example, a control plane protocol stack can comprise, in order from highest layer to lowest layer, NAS 457, RRC 455, PDCP 440, RLC 430, MAC 420, and PHY 44. In this example, upper layers 460 can be built on top of the NAS 457, which includes an IP layer 461, an SCTP 462, and an application layer signaling protocol (AP) 463.

In NR implementations, the AP 463 can be an NG application protocol layer (NGAP or NG-AP) 463 for the NG interface 113 defined between the NG-RAN node 111 and the AMF, or the AP 463 can be an Xn application protocol layer (XnAP or Xn-AP) 463 for the Xn interface that is defined between two or more RAN nodes 111.

The NG-AP 463 can support the functions of the NG interface 113 and can comprise Elementary Procedures (EPs). An NG-AP EP can be a unit of interaction between the NG-RAN node 111 and the AMF. The NG-AP 463 services can comprise two groups: UE-associated services (e.g., services related to a UE 101) and non-UE-associated services (e.g., services related to the whole NG interface instance between the NG-RAN node 111 and AMF). These services can include functions including, but not limited to: a paging function for the sending of paging requests to NG-RAN nodes 111 involved in a particular paging area; a UE context management function for allowing the AMF to establish, modify, and/or release a UE context in the AMF and the NG-RAN node 111; a mobility function for UEs 101 in ECM-CONNECTED mode for intra-system HOs to support mobility within NG-RAN and inter-system HOs to support mobility from/to EPS systems; a NAS Signaling Transport function for transporting or rerouting NAS messages between UE 101 and AMF; a NAS node selection function for determining an association between the AMF and the UE 101; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes 111 via CN 120; and/or other like functions.

The XnAP 463 can support the functions of the Xn interface and can comprise XnAP basic mobility procedures and XnAP global procedures. The XnAP basic mobility procedures can comprise procedures used to handle UE mobility within the NG RAN 111 (or E-UTRAN), such as handover preparation and cancellation procedures, SN Status Transfer procedures, UE context retrieval and UE context release procedures, RAN paging procedures, dual connectivity related procedures, and the like. The XnAP global procedures can comprise procedures that are not related to a specific UE 101, such as Xn interface setup and reset procedures, NG-RAN update procedures, cell activation procedures, and the like.

In LTE implementations, the AP 463 can be an S1 Application Protocol layer (S1-AP) 463 for the S1 interface 113 defined between an E-UTRAN node 111 and an MME, or the AP 463 can be an X2 application protocol layer (X2AP or X2-AP) 463 for the X2 interface that is defined between two or more E-UTRAN nodes 111.

The S1 Application Protocol layer (S1-AP) 463 can support the functions of the S1 interface, and similar to the NG-AP discussed previously, the S1-AP can comprise S1-AP EPs. An S1-AP EP can be a unit of interaction between the E-UTRAN node 111 and an MME within CN 120 (e.g., as an LTE or NR CN). The S1-AP 463 services can comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 463 can support the functions of the X2 interface XQ12 and can comprise X2AP basic mobility procedures and X2AP global procedures. The X2AP basic mobility procedures can comprise procedures used to handle UE mobility within the E-UTRAN XQ20, such as handover preparation and cancellation procedures, SN Status Transfer procedures, UE context retrieval and UE context release procedures, RAN paging procedures, dual connectivity related procedures, and the like. The X2AP global procedures can comprise procedures that are not related to a specific UE XQ01, such as X2 interface setup and reset procedures, load indication procedures, error indication procedures, cell activation procedures, and the like.

The SCTP layer (alternatively referred to as the SCTP/IP layer) 462 can provide guaranteed delivery of application layer messages (e.g., NGAP or XnAP messages in NR implementations, or S1-AP or X2AP messages in LTE implementations). The SCTP 462 can ensure reliable delivery of signaling messages between the RAN node 111 and the AMF/MME based, in part, on the IP protocol, supported by the IP 461. The Internet Protocol layer (IP) 461 can be used to perform packet addressing and routing functionality. In some implementations the IP layer 461 can use point-to-point transmission to deliver and convey PDUs. In this regard, the RAN node 111 can comprise L2 and L1 layer communication links (e.g., wired or wireless) with the MME/AMF to exchange information.

In a second example, a user plane protocol stack can comprise, in order from highest layer to lowest layer, SDAP 447, PDCP 440, RLC 430, MAC 420, and PHY 44. The user plane protocol stack can be used for communication between the UE 101, the RAN node 111, and UPF in NR implementations or an S-GW and P-GW in LTE implementations. In this example, upper layers 451 can be built on top of the SDAP 447, and can include a user datagram protocol (UDP) and IP security layer (UDP/IP) 452, a General Packet Radio Service (GPRS) Tunneling Protocol for the user plane layer (GTP-U) 453, and a User Plane PDU layer (UP PDU) 463.

The transport network layer 454 (also referred to as a "transport layer") can be built on IP transport, and the GTP-U 453 can be used on top of the UDP/IP layer 452 (comprising a UDP layer and IP layer) to carry user plane PDUs (UP-PDUs). The IP layer (also referred to as the "Internet layer") can be used to perform packet addressing and routing functionality. The IP layer can assign IP addresses to user data packets in any of IPv4, IPv6, or PPP formats, for example.

The GTP-U 453 can be used for carrying user data within the GPRS core network and between the radio access network and the core network. The user data transported can be packets in any of IPv4, IPv6, or PPP formats, for example. The UDP/IP 452 can provide checksums for data integrity, port numbers for addressing different functions at the source and destination, and encryption and authentication on the selected data flows. The RAN node 111 and the S-GW can utilize an S1-U interface to exchange user plane data via a protocol stack comprising an L1 layer (e.g., PHY 410), an L2 layer (e.g., MAC 420, RLC 430, PDCP 440, and/or SDAP 447), the UDP/IP layer 452, and the GTP-U 453. The S-GW and the P-GW can utilize an S5/S8a interface to exchange user plane data via a protocol stack comprising an L1 layer, an L2 layer, the UDP/IP layer 452, and the GTP-U 453. As discussed previously, NAS protocols can support the mobility of the UE 101 and the session management procedures to establish and maintain IP connectivity between the UE 101 and the P-GW.

Moreover, although not shown by FIG. 4, an application layer can be present above the AP 463 and/or the transport network layer 454. The application layer can be a layer in which a user of the UE 101, RAN node 111, or other network element interacts with software applications being executed, for example, by application circuitry 202 or application circuitry XS205, respectively. The application layer can also provide one or more interfaces for software applications to interact with communications systems of the UE 101 or RAN node 111, such as the baseband circuitry 204. In some implementations the IP layer and/or the application layer can provide the same or similar functionality as layers 5-7, or portions thereof, of the Open Systems Interconnection (OSI)

model (e.g., OSI Layer7—the application layer, OSI Layer 6—the presentation layer, and OSI Layer 5—the session layer).

Figure 5:
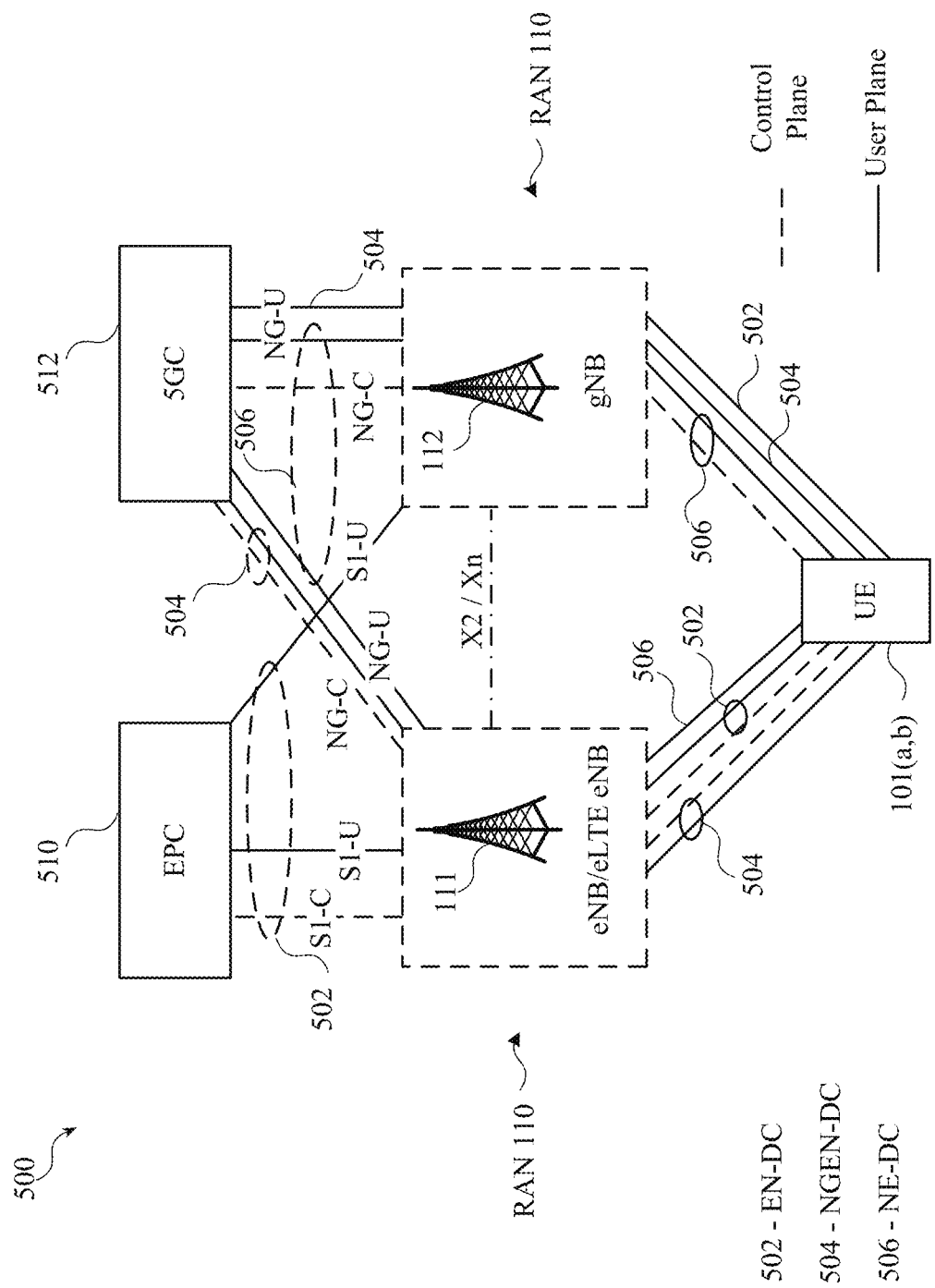
FIG. 5 is an illustration of LTE-NR interworking architectures that can be implemented with various aspects herein.

FIG. 5 illustrates an LTE-NR interworking architecture where NR is utilized in conjunction with LTE in a dual connectivity configuration, where both radio access technologies (RATs) can be connected to the LTE evolved packet core (EPC) as E-UTRAN-NR dual connectivity (EN-DC). At least two different technologies or RATs and their associated components can be enabled such that the LTE node (e.g., eNB 111) can operate as a master node (MN) controlling the radio connection of the UE 101 over the air interface, as well as control plane connection to the EPC 510 via the EN-DC S1 interfaces (S1-C, S1-U). NR or 5G core (5GC) 512 can provide enhanced capacity to the UE 101 via the new air interface, as well as an optional direct user plane link to the EPC 510.

E-UTRAN supports multi-radio dual connectivity (MR-DC) via EN-DC, in which the UE 101 can be connected to one eNB 111 that acts as the MN and at least one gNB 112, for example, that acts as a secondary node (SN). The eNB is connected to the EPC 510 via the S1 interface and to the gNB 112 via the X2/Xn interface. The gNB 112 can also be connected to the EPC 510 via the S1-U interface and other en-gNBs (not shown) via an X2-U interface, for example.

In MR-DC, two or more Component Carriers (CCs) may be aggregated over a plurality of cell groups. The UE 101 can simultaneously receive or transmit on multiple CCs depending on its capabilities. A maximum number of configured CCs for UE 101 can be configured respectively for DL and UL (e.g., 32 CCs, or other number of CCs). Depending on the UE's capabilities, up to a particular number of CCs can be configured for an E-UTRA cell group when the NR cell group is configured. For the NR cell group, the maximum number of configured CCs for the UE 101 can be split for DL and UL.

According to such EN-DC architecture, both the eNB 111 and gNB 112 can have a direct interface with the existing LTE EPC 510 in the user plane domain, which can be responsible for carrying user data. On the control plane side, instead, only the MN has a direct interface (S1-C) towards the EPC 510 on which all the signaling traffic between the UE 101 and CN (e.g., 120) are carried. Consequently, the MN (that uses LTE) can be configured for maintaining the connection state transitions, handling the connection setup/release, and performing the initial SN addition (i.e., also known as EN-DC setup).

Various other architectures can also be optioned and related to one another. In particular, the interfaces 506 refer to NR-E-UTRA Dual Connectivity (NE-DC) architectures where a standalone gNB (e.g., gNB 112), as well as an evolved LTE eNB (i.e., eLTE eNB 111) are connected to the new 5GC 512. Further, the interfaces 504, also known as Next Generation-RAN E-UTRA-NR Dual Connectivity (NGEN-DC), instead, the eLTE eNB and the gNB (i.e., similar to the EN-DC option) are connected to 5GC 512. These can further be referenced at 3GPP TS 38.801 specification.

EN-DC and NGEN-DC can be deployed for mobile broadband and low latency MTC services because they can guarantee high connectivity robustness (i.e., by deploying LTE of frequencies below 6 GHz), and, at the same time, low latencies due to NR deployed on high frequencies (i.e., above 6 GHz). EN-DC and NGEN-DC can differ substantially by the different core network used; in EN-DC, the LTE EPC is used whereas in NGEN-DC, the NR 5GC is utilized. For NE-DC, instead, this architecture option could be deployed for ad-hoc solutions/systems such as the ones related to factory automation scenarios, as such further ensure very low latencies by deploying NR as master node and then using LTE as a fallback solution.

In one aspect, link quality metrics can be evaluated by one or more processors of baseband circuitry 204 of the UE 101/200 based on a per RAT basis. Any of one or more links over an EN-DC with the eNB 111 can be evaluated for link quality based on a set of criteria, while one or more other links of the 5G RAT to the gNB 112 can be independently evaluated based on the same or a different set of criteria. One or more link quality metrics of the LQM evaluation can be measured based on various criteria, including, but not limited to, a data estimation, a subcarrier spacing (SCS), a numerology, beam switching, beam failures, secondary cell group (SCG) failures, a transmit power, an uplink grant size, buffer status reporting (BSR) thresholds, bandwidth part (BWP) switching, an uplink or downlink modulation coding scheme (MCS), a block error rate (BLER), or a power headroom report (PHR). Each of these criteria can further comprise a different weight as a factor/weighting in an LQM evaluation. For example, a data estimation can comprise a greater weight than other criteria, and thus, the data estimation can make up a greater percentage of the result from the LQM evaluation of a particular link or link quality metrics of a link/channel of the EN-DC. Data estimation can refer to an amount of data demands being driven over a link of a component carrier of a RAT, such as an LTE link or an NR link via the EN-DC. Data estimation can include data throughput (e.g., data rate or amount of data transfer over a given time) of any one link, such as in a DL link or an UL link for a given RAT for LQM evaluation. The criteria configuration can be based on parameters (e.g., layer 2 layer parameters). Based on whether a data estimation or whether data is being given for PSCell or other cell an LQM evaluation can be determined on a per RAT basis, as well as on a per CC basis separately between UL and DL links for example.

Numerology can refer to subcarrier spacing and symbol length with respect to LTE numerology, where NR supports multiple different types of subcarrier spacing (e.g., not only 15 K) as a part of the criteria for LQM evaluation of links associated with different RATs and CCs in an EN-DC. Various types of NR numerology can be referenced at TS 38.211, for example. Slot length can vary as well depending on numerology, as can numerology vary depending on a type of physical channel (or link) being evaluated (e.g., PDSCH, PUSCH, a synchronization channel (a primary synchronization signal (PSS), secondary synchronization signal (SSS), a physical broadcast channel (PBCH), a physical random access channel (PRACH), or the like).

A UL flow can be evaluated independently of a DL flow direction on the channel or link. An LQM evaluation of various metrics associated with each link can be performed in which most of the weight can be given to data estimation as a factor for UL and DL. Data estimation as well as any one of other criteria can be evaluated as a part of the LQM evaluation processes to provide further granularity. Any one or more of the criteria and their governed weight can be predefined, statically or dynamically configured via radio resource control (RRC) or a higher layer signally, for example. For example, an information element (IE) or a configuration element of an IE can indicate the parameters/weightings by which to perform LQM evaluation at different links independently for different RATs, CCs and bandwidth usage/direction (UL/DL).

In an aspect, in an EN-DC leg (e.g., NR, LTE), an LQM evaluation can be based on a frequency range 2 (FR2) CC even if the PScell is based on frequency range 1 (FR1). FR1 and FR2 referred to can reference the frequency band classifications for 5G-NR, and further classified into different sub-bands or bands according to frequency division duplex (FDD) bands, time division duplex (TDD) bands, or supplementary bands of different 5G NR bands (e.g., n1, n2, n3, n5, . . . n260, etc.). Alternatively, or additionally, if all the CCs are FR1 based, then the LQM can be derived from the PScell, which is the primary secondary cell of the link associated with the NR leg of EN-DC, for example.

In other aspects, because the LQM evaluation can be done on a per CC and per RAT basis, after the LQM evaluation data is reported to the base station (e.g., the eNB/gNB), an aggregated LQM can be communicate to the AP (e.g., the AP 106). The aggregated LQM can be determined based on the set of criteria discussed above. Each of the criteria can also be weighed or weighted differently in the calculation of the aggregated LQM. For example, data estimation can be factored with a greater weighting, while other criteria used to fine tune the LQM for EN-DC data flow at different levels.

Additionally, or alternatively, if one of the links of the EN-DC (e.g., NR link) encounters multiple RACH failure or SCG failures, the base station (e.g., eNB 111 or gNB 112) or other network component can remove these failures from a determination of the LQM or aggregate LQM value. The base station can then add these intervals of time back in a short interval of time (configurable value). The base station could apply a hysteresis while calculating the overall aggregated LQM. This hysteresis applied to the determination of the overall LQM as aggregated can ensure that the aggregated LQM does not fluctuate a lot, or reduce fluctuation in the overall LQM aggregated value, for example.

Figure 6:
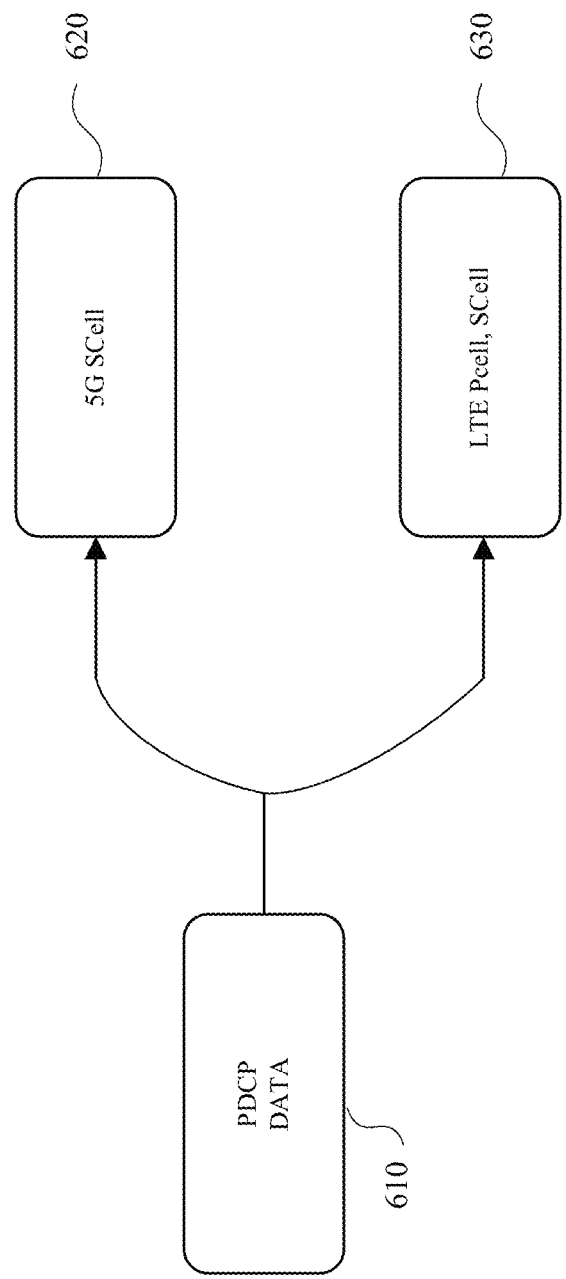
FIG. 6 is an illustration of an example protocol layer for evolved universal mobile telecommunications system terrestrial radio access network new radio (E-UTRAN-NR) Dual Connectivity (EN-DC) and Link Quality Metric (LQM) estimation/evaluation that can be implemented with various aspects herein.

Referring to FIG. 6, is an example UL data split protocol layer configuration 600 for 5G EN-DC and LQM estimation (evaluation) in accord with various aspects. The UL data split can be configured via a PDCP layer 610 such that network components or devices (e.g., eNB 111, gNB 112, or the like) can determine a split of data in uplink based on a UL data split threshold. The data split threshold can be configured by the network via the eNB 111 or 112 and provided via a UL DataSplit Threshold in a PDCP-config, or PDCP configuration element in order to split the data flow/throughput (Tput) between different RATs based on LQM(s) or LQM evaluation(s) reported. The UL data split threshold can enable data to be configured and received by the network so that data transmitted thru the PDCP 610 by the UE in UL is split to the 5G Scell 620 or LTE PCell or Scell 630 based on the threshold. Thus, UL data can be sent to 5G Scell 620 and LTE PSCell 630 or LTE Scell also. The data split between the 5G Scell 620 and LTE PCell or Scell 630 can be modified based on LQMs or LQM evaluations being performed on the links to by the UE 101, such that a change in the split threshold initiates a change in the data split between the different RATs.

In an aspect, the UE 101 or other network component/device can operate to generate one or more LQMs of the CCs per RAT based on a following representation for an uplink (UL) direction: $LQM_{UL}=\Sigma_{j=0}^{1} \Sigma_{i=0}^{i=n}\omega(j)*lqm(i)$, wherein lqm(i) comprises an LQM estimation per individual network or cell, $\omega(j)$ comprises a weighing factor for LTE or 5G, $\omega(0)$ comprises an LTE weighing factor, and $\omega(1)$ comprises a 5G weighing factor. The ratio of a PDCP threshold or data split threshold can be defined by eNB 111, for example, to split the throughput (Tput) between links of different RATs. This can be governed by UL-DataSplit-Threshold in a PDCP-Config, or PDCP configuration element. Depending on the weighing factor and amount of data estimated, the LQM can be performed on a per cell basis and over-all in the aggregate for LQM estimation on UL to be generated, where an aggregate LQM is determined based on any individual LQMs/LQM evaluation reported for the different links of different RATs. UL-DataSplitThreshold:: =ENUMERATED {b0, b100, b200, b400, b800, b1600, b3200, b6400, b12800, b25600, b51200, b102400, b204800, b409600, b819200, b1228800, b1638400, b2457600, b3276800, b4096000, b4915200, b5734400, b6553600, infinity, spare8, spare7, spare6, spare5, spare4, spare3, spare2, spare1}.

Figure 7:
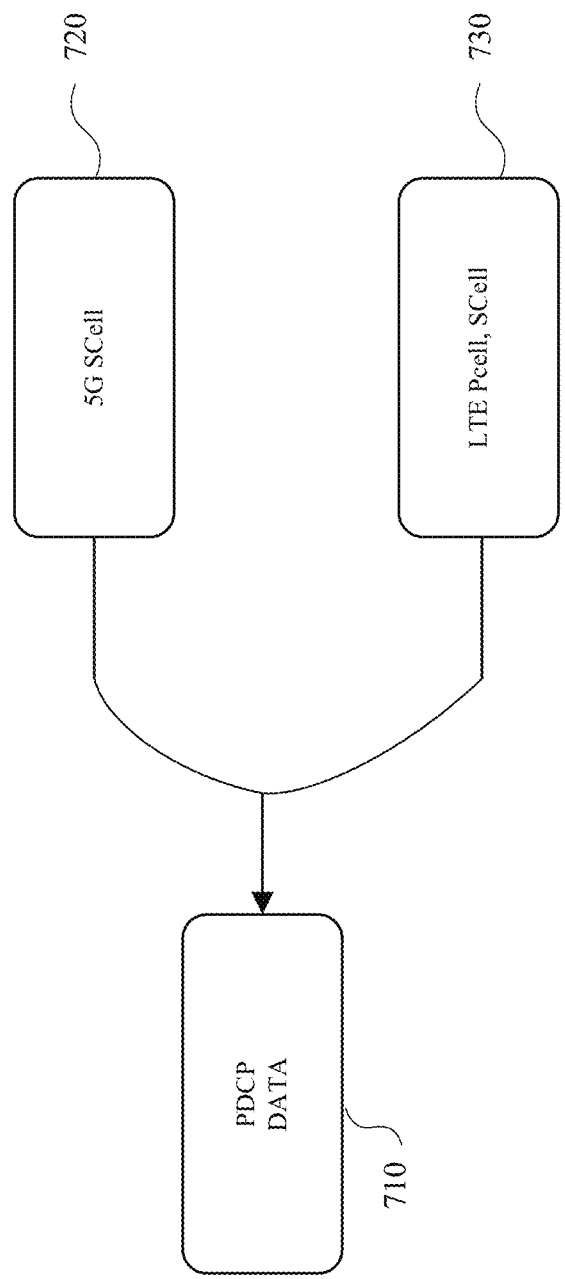
FIG. 7 is an illustration of another example protocol layer for evolved universal mobile telecommunications system terrestrial radio access network new radio (E-UTRAN-NR) Dual Connectivity (EN-DC) and Link Quality Metric (LQM) estimation/evaluation that can be implemented with various aspects herein.

FIG. 7 illustrates an example DL data split protocol layer configuration 700 for 5G EN-DC and LQM estimation in accord with various aspects. Similar to the UL data split configuration 600, for DL a data split can be configured by the network to the UE 101. For example, a data download from the network could be performed with 70% of the data (or another percentage) from the NR side with 30% from the LTE side depending on the split threshold, which may not be explicit at the end of the NW, but the UE 101 can determine the split ratio by doing separate NR and LTE LQM evaluations.

The split can be controlled via a split bearer from the network, which can be a radio bearer with RLC, MAC and PHY at both the eNB 111 for the EPC 510 and gNB 112 for the 5GC 512. Thus, the radio bearer can have multiple RLC bearers at both MCG and SCG. In ENDC at the PDCP layer the data is aggregated, but in the RLC, MAC and PHY split between the different RATs (e.g., LTE, 5G). As such, data reception in DL can be based on a split bearer in order to split the data flow between different RATs according to throughput based on LQMs or LQM evaluations discussed herein. The DL data split bearer can configure data to be received by a UE 101 as transmitted via the PDCP 610 from the 5G Scell 720 or LTE PCell or Scell 730. DL data can be sent from 5G Scell/PSCell 720, from LTE 730 on LTE Pcell and LTE Scell, or both.

In an aspect, the UE 101 or other network component/device can operate to generate LQMs/LQM evaluations to be reported based on a following representation for a downlink (DL) direction: $LQM_{DL}=\Sigma_{j=0}^{1} \Sigma_{i=0}^{i=n}\upsilon(j)*lqm(i)$, wherein lqm(i) comprises an LQM estimation per individual cell, $\upsilon(j)$ comprises a weighing factor for LTE or 5G, $\upsilon(0)$ comprises an LTE weighing factor, and $\upsilon(1)$ comprises a 5G weighing factor. The weighing factor $\upsilon(j)$ can be a ratio defined based on DL Tput estimation at PDCP level for LTE and 5G links via the eNB 111 and gNB 112, respectively. In one aspect, the weighing factor can be updated after a certain time threshold ($T_{Hold}$).

A similar logic on the DL applies as above for performing the individual network or cell LQM evaluations with different weighing factors for LTE and 5G, respectively. This ratio could be based on different criteria for configuration because per cell the network doesn't give any configuration in the DL. However, the UE can determine the amount of data provided in the DL and then determine how much throughput is being sent for both LTE and 5G separately in case of a split bearer.

In an aspect, the weighted/weighting factors $\omega(j)$ and $\upsilon(j)$ for UL and DL, respectively, could be based on any one or more of the following criteria: a data estimation and at least one of: a subcarrier spacing (SCS), a numerology, beam switching, beam failures, secondary cell group (SCG) failures, a transmit power, an uplink grant size, buffer status reporting (BSR) thresholds, bandwidth part (BWP) switching, an uplink or downlink modulation coding scheme (MCS), a block error rate (BLER), or a power headroom report (PHR). A first LQM evaluation can be for a PScell and a second LQM evaluation be for a secondary second cell (SScell) association.

The one or more evaluation criteria can include a weighting or a proportion/percentage of weight contribution to the LQM evaluation or the aggregative LQM for an overall LQM across links of different RATs. In one example, data estimation can comprise a greater weighting (e.g., about 60% or other portion). Other criteria can have different weightings also, which can be modified dynamically or statically based on an application at the UE 101 or another factor. For example, the other criteria could be about 2% to about 5% of the weight, or another percentage, either higher or lower.

Various aspects/aspects/examples can include suppressing the reporting of LQM factors or evaluations of the links with LQMs when doing an active foreground data transfer (either of high priority or a low priority). As such, the UE 101 can report a lower LQM to the AP or network in order to facilitate a back off or reduction of a low priority background transfer, for example. The UE 101 can then perform LQM evaluation and further report the LQM according to a desired split or for modification of the split. For example, if the UE 101 wants to increase foreground active data and decrease an amount of background data, it can report a lower or higher LQM in UL to initiate a modification of the split bearer for receiving DL data via the PDCP layer 710. In another example, when doing an active data download while background data is being processed/transferred the background flow could be enabled to be completely deterred or backed off by re-configuring or modifying the LQM reporting in a way to trigger the network to this action. This could be done by changing the split threshold, halting the background from one link of one RAT to just another (e.g., NR for direct data flow, or other RAT), or modifying a split bearer, for example.

In another aspect, the LQM weights and biasing of the data flow could be determined based on the adaptive receive/transmit diversity (ARTD) antenna algorithm, which can include a number of times the UE or network device does an antenna switch. The LQM evaluation(s) can be performed according to an LTE weighing factor and a 5G weighing factor that are based on a set of ARTD antenna processes according to a number of antenna switches or switching operations. The antenna switches would be a factor of the number of times the UE has had to switch from antenna 1 to antenna 2 to antenna 3, etc. and up and down an antenna hierarchy and developing a number of random antenna switching. If such antenna switching is occurring beyond a threshold or too many times there may be a problem that is made by the device. In these particular conditions, the UE 101 could desire to back off the background data as much as possible so LTE antenna space would be given a factor in the evaluation and the network would back-off sending background data, for example.

After determining the UL and DL LQM, the base station (e.g., eNB 111 or other network device) can aggregate both UL and DL LQM and report a unified LQM/aggregate LQM to the AP (e.g., AP 106). While reporting the unified LQM weight factor across UL and DL, the LQM could be selected depending on the type of application that has initiated the RRC Connection via the UE 101. Additionally, or alternatively, UL and DL can be estimated or evaluated separately be using per CC LQM based on the weighting factors and criteria separately for LTE and NR RAT as well as aggre-gating everything and reporting the LQM too by application. The application background should be agnostic and could be utilized as a parallel aggregation feature to send one output to the AP.

FIGS. 8-10 illustrated different RRC states and corresponding conditions to enter an LQM abort. In another aspect, when certain channel conditions are poor, and good amount, or all background data is desired to be throttled back, reduced or stopped so there is no background data being transferred as throughput, then depending on the RRC state an SCell NR RRC various abort conditions could be tagged. Here, the LQM evaluations could be aborted based on various entry criteria upon which to enter the LQM abort. Each of the RRC states can have different conditions to enter or exit LQM abort based on whether the entry criteria are determined to be good, fair or minimally viable, for example. LQM can abort as a worst possible state, it could be good, fair or minimally viable as a cell state. The first two columns explain what the entry state in this column is and the first column is whether LQM abort is entered into or not as defined by the various entry criteria. Then the third column is the criteria to exit and the fourth column defines what conditions LQM abort exit state is based on. Any one or more of the criteria to enter or exit LQM abort can be utilized for determining the enter or exist transitions related to LQM abort.

FIG. 8 illustrates an example of being in an RRC connected state and conditions for LQM abort 800 therein. For example, if configured to the RRC connection there can be selection failures and depending on the mobility there could be a defer of the LQM evaluation/reporting. For example, the criteria for entering the LQM abort state in the RRC idle state can include an n2 consecutive RRC setup request timeouts within a RAT counter (T300) so that if the timer expires after sending the particular message request then this will count towards a determination of whether to enter LQM abort or not and no longer perform LQM reporting/evaluation for a time period. Other criteria include an n3 reselection failures in normal mobility state within a time period (e.g., 30 s). Another criterium can include n3 reselection failures in a medium mobility state (NCR_M) within a timer period (e.g., 20 s). Another criterium can include n3 reselection failures in a high mobility state (NCR_H) within a timer period (e.g., 15 s). A number of n5 consecutive On-demand system information block (SIB) request failures (RRC System Info Request or RACH failure(s)), as well as a number of n1 consecutive RRC Rejects for RRC setup request can also be part of the criteria for entering LQM abort. Another criterium to be considered/factored in the decision to enter LQM abort can include none of beams satisfying an absolute threshold of a synchronization signal blocks consolidation for a higher rank frequency, or falling below a threshold number of beams satisfying absThreshSS-BlocksConsolidation for a higher rank frequency; for example, when the UE is camped to FR2, as well as FR1 having a same priority level, but none of the beams (antenna beams) satisfy absThreshSS-BlocksConsolidation. The criteria can include any one or more of the criterium or criteria for entering LQM abort.

Various exit criteria from LQM abort can include a successful RRC setup procedure, receiving the On-demand SIB successfully, or the UE being camped on a cell without re-selection failures for a period of time or X seconds/minutes, for example. Other criteria can include the device or UE being camped on FR2 and always disallowing background traffic.

In an aspect, exit from LQM abort to a better state could happen after a period of so many seconds after entry into abort. A cool off timer, for example, can enable the UE to exit from LQM abort, such as from a wait of 30 seconds or other period of time before the criteria is satisfied to enable re-enter to LQM operations/evaluations.

FIG. 9 illustrates an example of being in an RRC inactive state and conditions for LQM abort 900 therein. In an example, an entry into the LQM abort when in RRC inactive state where the state is good, fair or at least viable, could include a number of n1 consecutive RRC rejects for an RRC resume request (RRCResumeRequest), a number of n2 consecutive RRC setup requests (RRCSetupRequest) being timed out or associated with timeouts within a counter or timer (e.g., T319), as well as a number of n8 consecutive RNA update failures. These same conditions can also apply to RRC idle criteria of FIG. 8 illustrating an example of an RRC idle state and associated conditions for LQM abort 800 and used to factor into an estimation of whether to enter LQM abort. The exit of LQM abort can include a successful RRC resume procedure, a successfully received On-demand SIB, or a successful RNA update procedure. The exit other criteria are also similar to those conditions of FIG. 8.

FIG. 10 illustrates an example of an RRC idle state and associated conditions for LQM abort 1000. When in an RRC connected state the LQM abort can be entered into based on various beam failures and ENDC latency issues, for example. The criteria can the include a Max transmit Tx power trying to send high BSR (as pending on UE and without SUL) and then this could be factor in estimation of LQM abort. If an LTE neighbor has a better F but doesn't satisfy the B2 threshold, or the UE drops to LTE and continues with UL transmission. Other criteria can include a UL grant on FR2 that is not continuous, a number of x1 beam failures within a time period y1 in FR1 or FR2, a UE assistance information message with overheating assistance sent by the device, or a number of x3 RLFs when on FR2 within a time period y3 seconds, a ping pong handover between a same two NR cells multiple times with UL/DL being limited, a number of x4 consecutive reconfiguration failures within a time period of y4 seconds (e.g., same cells involve a 15 second timer), a number x6 consecutive SCG failures with a same NR cell within so many x minutes or seconds, or a number of x7 consecutive SCG failures with different NR cells within so many x minutes or seconds. The exit conditions from LQM abort can include a successful RRC reconfiguration procedure, no overheating of UE, or an acceptable UL/DL traffic flow. The exit criteria from LQM abort can include other criteria that are also similar to those conditions of FIG. 8.

While the methods described within this disclosure are illustrated in and described herein as a series of acts or events, it will be appreciated that the illustrated ordering of such acts or events are not to be interpreted in a limiting sense. For example, some acts can occur in different orders and/or concurrently with other acts or events apart from those illustrated and/or described herein. In addition, not all illustrated acts can be required to implement one or more aspects or aspects of the description herein. Further, one or more of the acts depicted herein can be carried out in one or more separate acts and/or phases. Reference can be made to the figures described above for ease of description. However, the methods are not limited to any particular aspect or example provided within this disclosure and can be applied to any of the systems disclosed herein.

Figure 11:
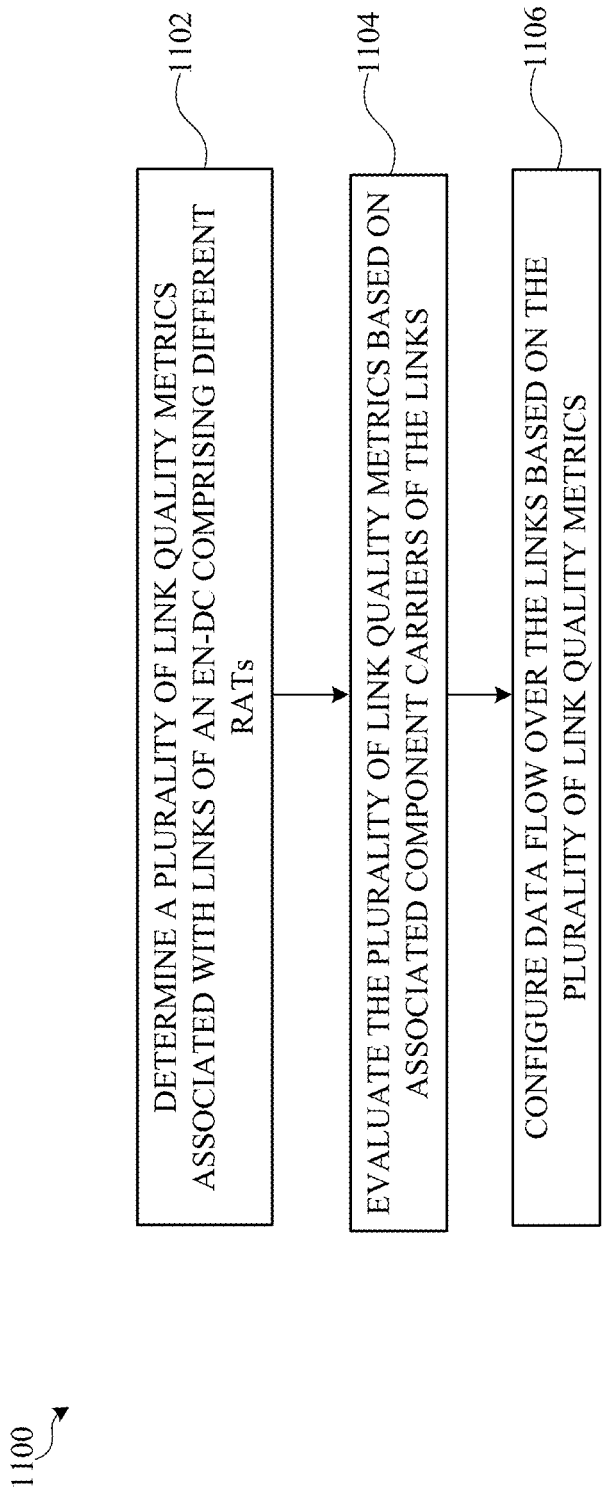
FIG. 11 is another block diagram illustrating an example process flow according to various aspects described herein.

Referring to FIG. 11, illustrated is an example process flow 1100 for a network device or component (e.g., UE 101, base station 110, AP 106 or other network component) to perform LQM evaluations and reporting. At 1102, the process flow 1100 includes determining a plurality of link quality metrics associated with links of an E-UTRAN new radio (NR) dual connectivity (EN-DC) comprising different radio access technologies (RATs). At 1104, the process flow 1100 comprises evaluating the plurality of link quality metrics based on associated component carriers of the links. At 1106, the process flow 1100 further comprises configuring data flow over the links based on the plurality of link quality metrics.

The process flow 1100 can further include aggregating the plurality of link quality metrics to communicate an aggregated link quality metric to an access point or a WLAN node to enable an uplink or a downlink based on a split ratio among the links of the EN-DC. An information element can be provided or communicated that comprises an uplink (UL) data split threshold in a packet data convergence protocol (PDCP) configuration element to define a split ratio that splits an UL data throughput among the links of the EN-DC based on the plurality of link quality metrics and one or more evaluation criteria (e.g., data estimation or other criteria).

At least one of a plurality of random access channel (RACH) failures or a plurality of secondary cell group (SCG) failures can be removed from evaluating the plurality of link quality metrics or the aggregate/over LQM value. A hysteresis can be applied to the aggregate LQM based on added time intervals related to the removal to determine an aggregated link quality metric of the plurality of link quality metrics. Once a first plurality of uplink link quality metrics and a second plurality of downlink quality metrics of the plurality of link quality metrics are aggregated or determined as an overall LQM value, this aggregate can be reported as an aggregated link quality metric (LQM) to an access point. Additionally, one or more LQM weight factor(s) can then be selected to be applied across the plurality of link quality metrics based on an application or its demands that initiated the RRC connection, for example.

Figure 12:
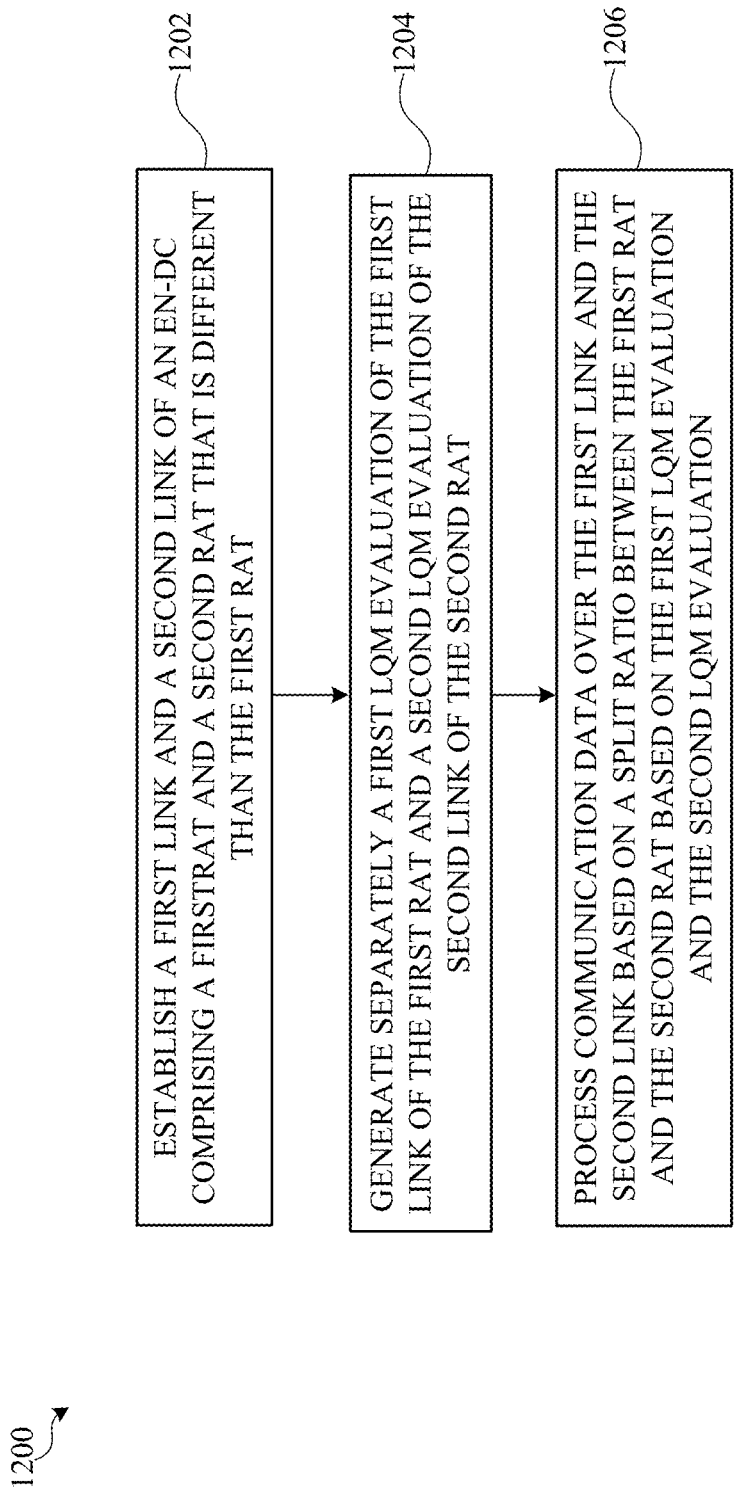
FIG. 12 is another block diagram illustrating an example process flow according to various aspects described herein

Referring to FIG. 12, illustrated is an example process flow 1200 for a network device or component (e.g., UE 101, base station 110, AP 106 or other network component) to perform LQM evaluations and reporting. At 1202, the process flow 1200 includes establishing a first link and a second link of an EN-DC comprising a first RAT (e.g., LTE) and a second RAT (e.g., 5G NR) that is different than the first RAT. At 1204, the process flow 1200 comprises generating separately a first link quality metric (LQM) evaluation of the first link of the first RAT and a second LQM evaluation of the second link of the second RAT. At 1206, the process flow 1200 further includes processing communication data over the first link and the second link based on a split ratio between the first RAT and the second RAT based on the first LQM evaluation and the second LQM evaluation.

The first link can be coupled to the first link is coupled to a primary cell (or a primary second cell (PScell) of the first RAT, and the second link can be coupled to a secondary cell (or an SCell) of the second RAT. The split ratio splits data throughput between the first link and the second link of the EN-DC based on the first LQM evaluation and the second LQM evaluation.

The process flow 1200 can also include determining the first LQM evaluation based on an LTE weighing factor and the second LQM evaluation based on a 5G weighing factor. The LTE weighing factor and the 5G weighing factor can be modified to modify the split ratio for a downlink throughput or an uplink throughput of the EN-DC, wherein the split ratio is based on a downlink throughput estimation at a packet data convergence protocol (PDCP) layer for the first RAT as an LTE RAT and the second RAT as a 5G RAT. The split ratio can be based on a data split threshold of an uplink throughput defined by a PDCP configuration element of an information element.

In other aspects, for example, the process flows can include aborting at least one of: the first LQM evaluation or the second LQM evaluation based on a radio resource control (RRC) state and a set of conditions associated with the RRC state, as discussed herein.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

Examples (aspects) can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to aspects and examples described herein.

A first example is an apparatus employed in a user equipment (UE) comprising processing circuitry that is configured to: configure a plurality of links of an E-UTRAN new radio (NR) dual connectivity (EN-DC) comprising a first radio access technology (RAT) and a second RAT that is different than the first RAT; and generate independently a first link quality metric (LQM) evaluation of the first RAT and a second LQM evaluation of the second RAT. The UE further comprises a radio frequency (RF) interface, configured to provide, to RF circuitry, data for a transmission of the first LQM evaluation and the second LQM evaluation based on a data split at a protocol layer.

A second example can include the first example, wherein the processing circuitry is further configured to determine the first LQM evaluation and the second LQM evaluation according to associated component carriers, respectively.

A third example can include the first or second example, wherein the protocol layer comprises a packet data convergence protocol (PDCP) layer and the data is split based on an uplink data split threshold in uplink between at least one primary cell of the first RAT and at least one secondary cell of the second RAT.

A fourth example can include any one or more of the first through third examples, wherein the processing circuitry is further configured to generate, on a per carrier basis, the first LQM evaluation and the second LQM evaluation based on a frequency range 2 (FR2) in response to the primary secondary (PScell) cell being based on frequency range 1 (FR1), or based on the PScell in response to each component carrier of the plurality of links of the EN-DC being within the FR1.

A fifth example can include any one or more of the first through fourth examples, wherein the processing circuitry is further configured to generate the first LQM evaluation and the second LQM evaluation based on an uplink bandwidth usage, a downlink bandwidth usage, or both the uplink bandwidth usage and the downlink bandwidth usage.

A sixth example can include any one or more of the first through fifth examples, wherein the processing circuitry is further configured to generate the first LQM evaluation and the second LQM evaluation corresponding to uplink and downlink based on a set of evaluation criteria for a PScell associated with the first LQM evaluation and a secondary second cell (SScell) associated with the second LQM evaluation, wherein the set of evaluation criteria comprises a data estimation and at least one of: a subcarrier spacing (SCS), a numerology, beam switching, beam failures, secondary cell group (SCG) failures, a transmit power, an uplink grant size, buffer status reporting (BSR) thresholds, bandwidth part (BWP) switching, an uplink or downlink modulation coding scheme (MCS), a block error rate (BLER), or a power headroom report (PHR), and wherein one or more evaluation criteria of the set of evaluation criteria comprise a weighting, wherein the data estimation comprises a greater weighting.

A seventh example can include any one or more of the first through sixth examples, wherein the processing circuitry is further configured to process data over the plurality of links of the first RAT and the second RAT based on a ratio therebetween, and process the data different over a modified ration based on at least one of: the first LQM evaluation or the second LQM evaluation.

An eighth example can include any one or more of the first through seventh examples, wherein the processing circuitry is further configured to generate the first LQM evaluation and the second LQM evaluation based on a following representation for an uplink (UL) direction: $LQM_{UL}=\Sigma_{j=0}^{1}\Sigma_{i=0}^{i=n}\omega(j)*lqm(i)$, wherein lqm(i) comprises an LQM estimation per individual cell, $\omega(j)$ comprises a weighing factor for LTE or 5G, $\omega(0)$ comprises an LTE weighing factor, and $\omega(1)$ comprises a 5G weighing factor, and another following representation for a downlink (DL) direction: $LQM_{DL}=\Sigma_{j=0}^{1}\Sigma_{i=0}^{i=n}\upsilon(j)*lqm(i)$, wherein lqm(i) comprises an LQM estimation per individual cell, $\upsilon(j)$ comprises a weighing factor for LTE or 5G, $\upsilon(0)$ comprises an LTE weighing factor, and $\upsilon(1)$ comprises a 5G weighing factor.

A ninth example can include any one or more of the first through eighth examples, wherein the processing circuitry is further configured to configure at least one of: LQM reporting, the first LQM evaluation, or the second LQM evaluation, to cause a background data transfer to be backed off via the EN-DC in response to an active foreground data transfer comprising a higher priority than the background data transfer.

A tenth example can include any one or more of the first through ninth examples, wherein the processing circuitry is further configured to generate an LQM abort to reduce background data transfer based on a radio resource control (RRC) state comprising an RRC idle state, an RRC inactive state, or an RRC connected state, and one or more conditions associated with the RRC state.

An eleventh example can be a tangible computer readable storage device storing executable instructions that, in response to execution, cause one or more processors of a network component comprising a base station to perform operations, the operations comprising: determining a plurality of link quality metrics associated with links of a E-UTRAN new radio (NR) dual connectivity (EN-DC) comprising different radio access technologies (RATs); evaluating the plurality of link quality metrics based on associated component carriers of the links; and configuring data flow over the links based on the plurality of link quality metrics.

A twelfth example can include the eleventh example, the operations further comprising: aggregating the plurality of link quality metrics to communicate an aggregated link quality metric to an access point or a WLAN node to enable an uplink or a downlink based on a split ratio among the links of the EN-DC.

A thirteenth example can include any one or more of the eleventh through the twelfth examples, the operations further comprising: providing an information element comprising an uplink (UL) data split threshold in a packet data convergence protocol (PDCP) configuration element to define a split ratio that splits an UL data throughput among the links of the EN-DC based on the plurality of link quality metrics and one or more evaluation criteria, wherein the one or more evaluation criteria comprises a data estimation.

A fourteenth example can include any one or more of the eleventh through the thirteenth examples, the operations further comprising: generating a removal of at least one of: a plurality of random access channel (RACH) failures or a plurality of secondary cell group (SCG) failures in evaluating the plurality of link quality metrics; and applying a hysteresis based on added time intervals related to the removal to determine an aggregated link quality metric of the plurality of link quality metrics.

A fifteenth example can include any one or more of the eleventh through the fourteenth examples, the operations further comprising: aggregating a first plurality of uplink link quality metrics and a second plurality of downlink quality metrics of the plurality of link quality metrics to report an aggregated link quality metric (LQM) to an access point; and selecting an LQM weight factor to be applied across the plurality of link quality metrics based on an application that initiated an RRC connection.

A sixteenth example can be a tangible computer readable storage device storing executable instructions that, in response to execution, cause one or more processors of a user equipment (UE) to perform operations, the operations comprising: establishing a first link and a second link of a E-UTRAN new radio (NR) dual connectivity (EN-DC) comprising a first radio access technology (RAT) and a second RAT that is different than the first RAT; generating separately a first link quality metric (LQM) evaluation of the first link of the first RAT and a second LQM evaluation of the second link of the second RAT; and processing communication data over the first link and the second link based on a split ratio between the first RAT and the second RAT based on the first LQM evaluation and the second LQM evaluation.

A seventeenth example can include the sixteenth example, wherein the first link is coupled to a primary cell of the first RAT, and the second link is coupled to a secondary cell of the second RAT, wherein the split ratio splits data throughput between the first link and the second link of the EN-DC based on the first LQM evaluation and the second LQM evaluation, and wherein the first RAT comprises a long term evolution (LTE) RAT of an eNodeB (eNB), and the second RAT comprises a secondary RAT of a next generation NodeB (gNB).

An eighteenth example can include any one or more of the sixteenth through the seventeenth examples, the operations further comprising: determining the first LQM evaluation based on an LTE weighing factor and the second LQM evaluation based on a 5G weighing factor; and modifying the LTE weighing factor and the 5G weighing factor to modify the split ratio for a downlink throughput or an uplink throughput of the EN-DC, wherein the split ratio is based on a downlink throughput estimation at a packet data convergence protocol (PDCP) layer for the first RAT as an LTE RAT and the second RAT as a 5G RAT, and wherein the split ratio is based on a data split threshold of an uplink throughput defined by a PDCP configuration element of an information element.

A nineteenth example can include any one or more of the sixteenth through the eighteenth examples the operations further comprising: determining the first LQM evaluation and the second LQM evaluation according to an LTE weighing factor and a 5G weighing factor that are based on a set of adaptive receive/transmit diversity (ARTD) antenna processes based on a number of antenna switches.

A twentieth example can include any one or more of the sixteenth through the nineteenth examples, the operations further comprising: aborting at least one of: the first LQM evaluation or the second LQM evaluation based on a radio resource control (RRC) state and a set of conditions associated with the RRC state.

An twenty-first example can include any one or more of the sixteenth through the twentieth examples, wherein the RRC state comprises an RRC connected state and the set of conditions comprises at least one of: a number of beam related failures, a number of secondary cell group (SCG) failures, a number of radio link failures (RLFs), or a number of mmWave failures; wherein the RRC state comprises an RRC inactive state and the set of conditions comprises at least one of: a number of RRC rejects for an RRC resume request, a number of timeouts for an RRC setup request, or a number of RAN-based Notification Area (RNA) update failures; or wherein the RRC state comprises an RRC idle state and the set of conditions comprises at least one of: the number of RRC rejects for the RRC resume request, the number of timeouts for the RRC setup request, a number of system information block (SIB) failures, a number of reselection failures for a normal/medium/high mobility state, or a threshold failure for beams for a higher frequency.

A twenty-second example can include an apparatus comprising means to perform one or more elements of a method described in or related to any of first thru twenty-first examples, or any other method or process described herein.

A twenty-third example can include one or more non-transitory computer-readable media comprising instructions to cause an electronic device, upon execution of the instructions by one or more processors of the electronic device, to perform one or more elements of a method described in or related to any one of the first thru twenty-first examples, or any other method or process described herein.

A twenty-fourth example can include an apparatus comprising logic, modules, or circuitry to perform one or more elements of a method described in or related to any one of the first thru twenty-first examples, or any other method or process described herein.

A twenty-fifth example can include a method, technique, or process as described in or related any one of the first thru twenty-first examples, or portions or parts thereof.

A twenty-sixth example can include an apparatus comprising: one or more processors and one or more computer-readable media comprising instructions that, when executed by the one or more processors, cause the one or more processors to perform the method, techniques, or process as described in or related to any one of the first thru twenty-first examples, or portions thereof.

A twenty-seventh example can include a signal as described in or related to any of examples 1-21, or portions or parts thereof.

A twenty-eighth example can include a datagram, packet, frame, segment, protocol data unit (PDU), or message as described in or related to any one of the first thru twenty-first examples, or portions or parts thereof, or otherwise described in the present disclosure.

A twenty-ninth example can include a signal encoded with data as described in or related to any one of the first thru twenty-first examples, or portions or parts thereof, or otherwise described in the present disclosure.

A thirtieth example can include a signal encoded with a datagram, packet, frame, segment, protocol data unit (PDU), or message as described in or related to any one of the first thru twenty-first examples, or portions or parts thereof, or otherwise described in the present disclosure.

A thirty-first example can include an electromagnetic signal carrying computer-readable instructions, wherein execution of the computer-readable instructions by one or more processors is to cause the one or more processors to perform the method, techniques, or process as described in or related to any one of the first thru twenty-first examples, or portions thereof.

A thirty-second example can include a computer program comprising instructions, wherein execution of the program by a processing element is to cause the processing element to carry out the method, techniques, or process as described in or related to any one of the first thru twenty-first examples, or portions thereof.

A thirty-third example can include a signal in a wireless network as shown and described herein.

A thirty-fourth example can include a method of communicating in a wireless network as shown and described herein.

A thirty-fifth example can include a system for providing wireless communication as shown and described herein.

A thirty-sixth example can include a device for providing wireless communication as shown and described herein.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the processes and/or actions of a method or algorithm can reside as one or any combination or set of codes and/or instructions on a machine-readable medium and/or computer readable medium, which can be incorporated into a computer program product.

In this regard, while the disclosed subject matter has been described in connection with various aspects and corresponding Figures, where applicable, it is to be understood that other similar aspects can be used or modifications and additions can be made to the described aspects for performing the same, similar, alternative, or substitute function of the disclosed subject matter without deviating therefrom. Therefore, the disclosed subject matter should not be limited to any single embodiment/aspect described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. An apparatus employed in a user equipment (UE), comprising:
   processing circuitry configured to:
      configure a plurality of links of an E-UTRAN new radio (NR) dual connectivity (EN-DC) comprising a first radio access technology (RAT) and a second RAT that is different than the first RAT; and
      generate independently a first link quality metric (LQM) evaluation of the first RAT and a second LQM evaluation of the second RAT;
   a radio frequency (RF) interface, configured to provide data for a transmission of an aggregated LQM derived from the first LQM evaluation and the second LQM evaluation based on a data split at a packet data convergence protocol (PDCP) layer.

2. The apparatus of claim 1, wherein the processing circuitry is further configured to determine the first LQM evaluation and the second LQM evaluation according to associated component carriers, respectively.

3. The apparatus of claim 1, wherein the data is split based on an uplink data split threshold in uplink between at least one primary cell of the first RAT and at least one secondary cell of the second RAT.

4. The apparatus of claim 3, wherein the processing circuitry is further configured to generate, on a per carrier basis, the first LQM evaluation and the second LQM evaluation based on a frequency range 2 (FR2) in response to a primary secondary cell (PScell) being based on frequency range 1 (FR1), or based on the PScell in response to each component carrier of the plurality of links of the EN-DC being within the FR1.

5. The apparatus of claim 1, wherein the processing circuitry is further configured to generate the first LQM evaluation and the second LQM evaluation based on an uplink bandwidth usage, a downlink bandwidth usage, or both the uplink bandwidth usage and the downlink bandwidth usage.

6. The apparatus of claim 1, wherein the processing circuitry is further configured to generate the first LQM evaluation and the second LQM evaluation corresponding to uplink and downlink based on a set of evaluation criteria for a PScell associated with the first LQM evaluation and a secondary second cell (SScell) associated with the second LQM evaluation, wherein the set of evaluation criteria comprises a data estimation and at least one of: a subcarrier spacing (SCS), a numerology, beam switching, beam failures, secondary cell group (SCG) failures, a transmit power, an uplink grant size, buffer status reporting (BSR) thresholds, bandwidth part (BWP) switching, an uplink or downlink modulation coding scheme (MCS), a block error rate (BLER), or a power headroom report (PHR), and wherein one or more evaluation criteria of the set of evaluation criteria comprise a weighting, wherein the data estimation comprises a greater weighting than other evaluation criteria.

7. The apparatus of claim 1, wherein the processing circuitry is further configured to process data over the plurality of links of the first RAT and the second RAT based on a ratio therebetween, and process the data different over a modified ration based on at least one of: the first LQM evaluation or the second LQM evaluation.

8. The apparatus of claim 1, wherein the processing circuitry is further configured to generate the first LQM evaluation and the second LQM evaluation based on a following representation for an uplink (UL) direction: $LQM_{UL}=\Sigma_{j=0}^{1} \Sigma_{i=0}^{i=n}\omega(j)*lqm(i)$, wherein lqm(i), wherein lqm(i) comprises an LQM estimation per individual cell, $\omega(j)$ comprises a weighing factor for LTE or 5G, $\omega(0)$ comprises an LTE weighing factor, and w(1) comprises a 5G weighing factor, and another following representation for a downlink (DL) direction: $LQM_{DL}=\Sigma_{j=0}^{1} \Sigma_{i=0}^{i=n}\upsilon(j)*lqm(i)$, wherein lqm(i), wherein lqm(i) comprises an LQM estimation per individual cell, $\upsilon(j)$ comprises a weighing factor for LTE or 5G, $\upsilon(0)$ comprises an LTE weighing factor, and $\upsilon(1)$ comprises a 5G weighing factor.

9. The apparatus of claim 1, wherein the processing circuitry is further configured to configure at least one of: LQM reporting, the first LQM evaluation, or the second LQM evaluation, to cause a background data transfer to be backed off via the EN-DC in response to an active foreground data transfer comprising a higher priority than the background data transfer.

10. The apparatus of claim 1, wherein the processing circuitry is further configured to generate an LQM abort to reduce background data transfer based on a radio resource control (RRC) state comprising an RRC idle state, an RRC inactive state, or an RRC connected state, and one or more conditions associated with the RRC state.

11. A tangible computer readable storage device storing executable instructions that, in response to execution, cause one or more processors of a network component comprising a base station to perform operations, the operations comprising:
  determining a plurality of link quality metrics associated with links of a E-UTRAN new radio (NR) dual connectivity (EN-DC) comprising different radio access technologies (RATs);
  evaluating the plurality of link quality metrics based on associated component carriers of the links; and
  configuring data flow over the links based on the plurality of link quality metrics.

12. The tangible computer readable storage device of claim 11, the operations further comprising:
  aggregating the plurality of link quality metrics to communicate an aggregated link quality metric to an access point or a WLAN node to enable an uplink or a downlink based on a split ratio among the links of the EN-DC.

13. The tangible computer readable storage device of claim 11, the operations further comprising:
  providing an information element comprising an uplink (UL) data split threshold in a packet data convergence protocol (PDCP) configuration element to define a split ratio that splits an UL data throughput among the links of the EN-DC based on the plurality of link quality metrics and one or more evaluation criteria, wherein the one or more evaluation criteria comprises a data estimation.

14. The tangible computer readable storage device of claim 11, the operations further comprising:
  generating a removal of at least one of: a plurality of random access channel (RACH) failures or a plurality of secondary cell group (SCG) failures in evaluating the plurality of link quality metrics; and
  applying a hysteresis based on added time intervals related to the removal to determine an aggregated link quality metric of the plurality of link quality metrics.

15. The tangible computer readable storage device of claim 11, the operations further comprising:
  aggregating a first plurality of uplink link quality metrics and a second plurality of downlink quality metrics of the plurality of link quality metrics to report an aggregated link quality metric (LQM) to an access point; and
  selecting an LQM weight factor to be applied across the plurality of link quality metrics based on an application that initiated an RRC connection.

16. A tangible computer readable storage device storing executable instructions that, in response to execution, cause one or more processors of a user equipment (UE) to perform operations, the operations comprising:
  establishing a first link and a second link of a E-UTRAN new radio (NR) dual connectivity (EN-DC) comprising a first radio access technology (RAT) and a second RAT that is different than the first RAT;
  generating separately a first link quality metric (LQM) evaluation of the first link of the first RAT and a second LQM evaluation of the second link of the second RAT; and processing communication data over the first link and the second link based on a split ratio between the first RAT and the second RAT based on the first LQM evaluation and the second LQM evaluation;

wherein the first LQM evaluation is determined based on an LTE weighing factor, and the second LQM evaluation is determined based on a 5G weighing factor, wherein the LTE weighing factor and the 5G weighing factor respectively comprises a set of evaluation criteria comprising a data estimation and one or more of: a subcarrier spacing (SCS), a numerology, beam switching, beam failures, secondary cell group (SCG) failures, a transmit power, an uplink grant size, buffer status reporting (BSR) thresholds, bandwidth part (BWP) switching, an uplink or downlink modulation coding scheme (MCS), a block error rate (BLER), and a power headroom report (PHR).

17. The tangible computer readable storage device of claim 16, wherein the first link is coupled to a primary cell of the first RAT, and the second link is coupled to a secondary cell of the second RAT, wherein the split ratio splits data throughput between the first link and the second link of the EN-DC based on the first LQM evaluation and the second LQM evaluation, and wherein the first RAT comprises a long term evolution (LTE) RAT of an eNodeB (eNB), and the second RAT comprises a secondary RAT of a next generation NodeB (gNB).

18. The tangible computer readable storage device of claim 16, the operations further comprising:

modifying the LTE weighing factor and the 5G weighing factor to modify the split ratio for a downlink throughput or an uplink throughput of the EN-DC, wherein the split ratio is based on a downlink throughput estimation at a packet data convergence protocol (PDCP) layer for the first RAT as an LTE RAT and the second RAT as a 5G RAT, and wherein the split ratio is based on a data split threshold of an uplink throughput defined by a PDCP configuration element of an information element.

19. The tangible computer readable storage device of claim 16, the operations further comprising:

determining the first LQM evaluation and the second LQM evaluation according to the LTE weighing factor and the 5G weighing factor that are based on a set of adaptive receive/transmit diversity (ARTD) antenna processes based on a number of antenna switches.

20. The tangible computer readable storage device of claim 16, the operations further comprising:

aborting at least one of: the first LQM evaluation or the second LQM evaluation based on a radio resource control (RRC) state and a set of conditions associated with the RRC state.

21. The tangible computer readable storage device of claim 20, wherein the RRC state comprises an RRC connected state and the set of conditions comprises at least one of: a number of beam related failures, a number of secondary cell group (SCG) failures, a number of radio link failures (RLFs), or a number of mmWave failures; wherein the RRC state comprises an RRC inactive state and the set of conditions comprises at least one of: a number of RRC rejects for an RRC resume request, a number of timeouts for an RRC setup request, or a number of RAN-based Notification Area (RNA) update failures; or wherein the RRC state comprises an RRC idle state and the set of conditions comprises at least one of: the number of RRC rejects for the RRC resume request, the number of timeouts for the RRC setup request, a number of system information block (SIB) failures, a number of reselection failures for a normal/medium/high mobility state, or a threshold failure for beams for a higher frequency.

* * * * *